(12) United States Patent
Banerjee et al.

(10) Patent No.: US 10,163,244 B2
(45) Date of Patent: Dec. 25, 2018

(54) CREATING REUSABLE AND CONFIGURABLE DIGITAL WHITEBOARD ANIMATIONS

(71) Applicant: Adobe Systems Incorporated, San Jose, CA (US)

(72) Inventors: Sriraj Banerjee, Karnataka (IN); Karnati Penchala Charith Chowdary, Karnataka (IN); Ashish Garg, Karnataka (IN)

(73) Assignee: ADOBE SYSTEMS INCORPORATION, San Jose, CA (US)

(*) Notice: Subject to any disclaimer, the term of this patent is extended or adjusted under 35 U.S.C. 154(b) by 178 days.

(21) Appl. No.: 15/014,654

(22) Filed: Feb. 3, 2016

(65) Prior Publication Data

US 2017/0221253 A1    Aug. 3, 2017

(51) Int. Cl.
G06T 11/00    (2006.01)
G06T 13/80    (2011.01)

(52) U.S. Cl.
CPC ............ G06T 13/80 (2013.01); G06T 11/001 (2013.01)

(58) Field of Classification Search
None
See application file for complete search history.

(56) References Cited

U.S. PATENT DOCUMENTS

| | | | | |
|---|---|---|---|---|
| 6,560,361 B1* | 5/2003 | Collins | ............ | G06K 9/00476 382/164 |
| 2006/0066754 A1* | 3/2006 | Zaima | ............ | G06F 17/214 348/564 |
| 2010/0188409 A1* | 7/2010 | Ooba | ............ | G06F 3/0488 345/473 |
| 2013/0047072 A1* | 2/2013 | Bailor | ............ | G06F 17/2288 715/234 |
| 2014/0355884 A1* | 12/2014 | Tran | ............ | G06K 9/18 382/188 |
| 2015/0062129 A1* | 3/2015 | Wilensky | ............ | G06T 11/203 345/442 |
| 2015/0199315 A1* | 7/2015 | Grieve | ............ | G06F 17/212 715/753 |

* cited by examiner

*Primary Examiner* — Kee M Tung
*Assistant Examiner* — Yanna Wu
(74) *Attorney, Agent, or Firm* — Keller Jolley Preece

(57) ABSTRACT

Methods and systems for creating animation elements from digital drawings. In particular, one or more embodiments detect a digital drawing input stream including a plurality of strokes. One or more embodiments identify a plurality of stroke points for each stroke from the plurality of strokes, and determine a plurality of timestamps for the plurality of stroke points. One or more embodiments generate an animation element based on the plurality of stroke points and the plurality of timestamps. One or more embodiments also receive a selection to insert the animation element into a user interface, and insert the animation element with associated drawing time information and stroke point information into the user interface in response to the received selection.

20 Claims, 15 Drawing Sheets

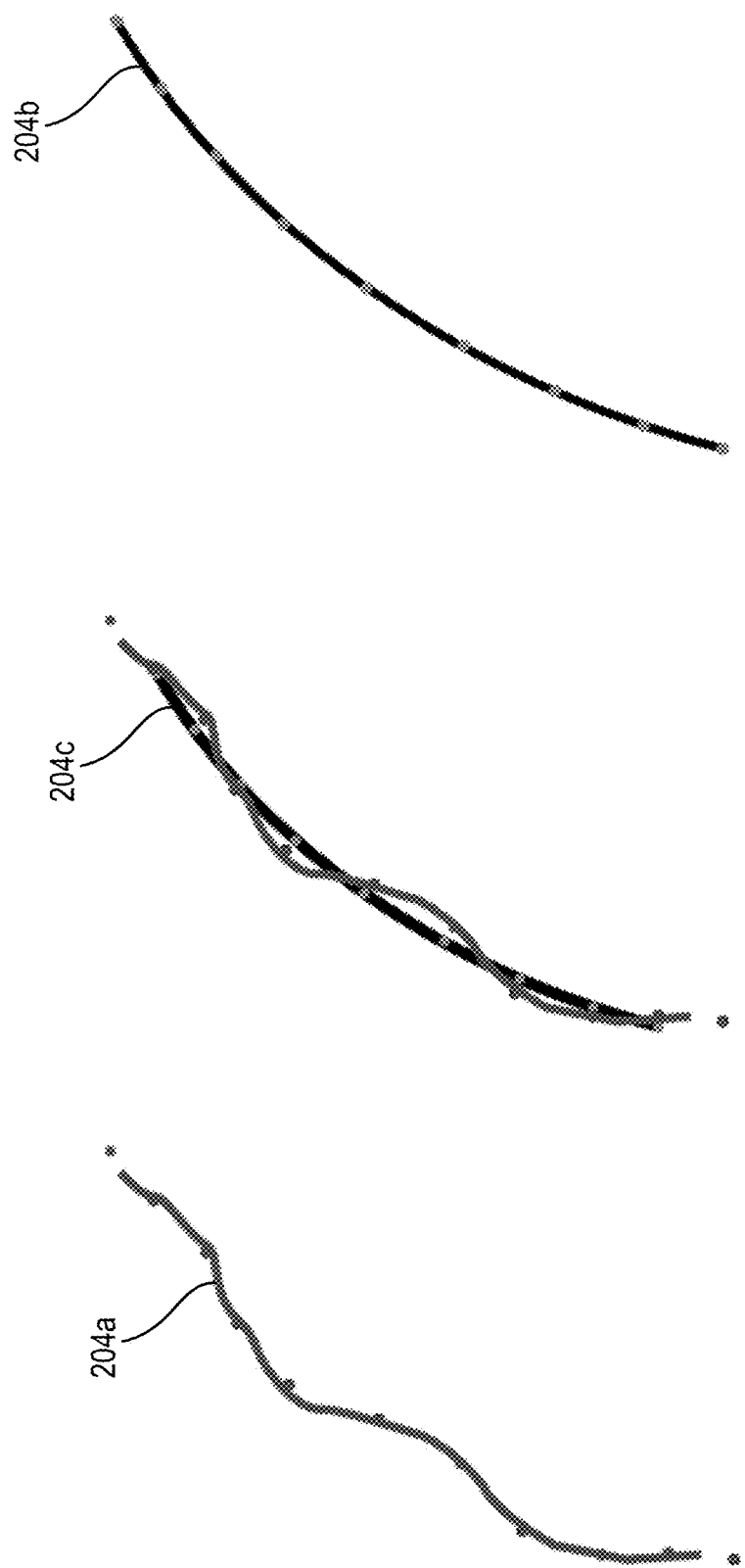

CREATING REUSABLE AND CONFIGURABLE DIGITAL WHITEBOARD ANIMATIONS

BACKGROUND

1. Technical Field

One or more embodiments relate generally to systems and methods for generating animation elements. More specifically, one or more embodiments of the present invention relate to systems and methods of generating a reusable animation element from a digital drawing input stream.

2. Background and Relevant Art

Illustrating graphical designs or drawings by animating the designs on a whiteboard or similar surface is a popular effect used in marketing, presentations, and animation industries. In particular, displaying the process of a person drawing a graphical design (or of a design otherwise being illustrated) on a whiteboard is often more effective than merely displaying the finished design. For example, illustrating the creation of the design can be an engaging and pleasing experience for viewers. By illustrating the drawing process of a design to viewers, an advertiser or presenter often creates a connection between the viewers and the advertisement, presentation, or other media.

Some conventional animation methods capture video of whiteboard animations for use in marketing, presentations, or animations. For example, some methods use a camera to capture continuous video of a person sketching or drawing a design on a whiteboard. Other methods capture stop-motion or time-lapse video of a sketch or drawing and convert the video into a whiteboard animation. Although such methods are able to create videos of whiteboard animations, once videos of the whiteboard animations are created, the animations in the videos are static and unchangeable.

In other conventional animation methods, computing applications are able to create animations by creating videos of a digital drawing within the computing application. Specifically, some conventional computing applications detect the drawing input and store the drawing input as a video. The conventional computing applications can then replay the video of the drawing input within the computing applications. Such conventional animation methods are limited to the same application in which the video is captured and the videos are static once they are created.

These and other disadvantages may exist with respect to conventional design animation techniques.

SUMMARY

Introduced here are techniques/technology for creating reusable animation elements from digital drawing input streams. For example, one or more embodiments include systems and methods to generate an animation element based on a plurality of strokes from a digital drawing input stream. In particular, one or more embodiments detect a digital drawing input stream including a plurality of strokes and identify a plurality of stroke points for each stroke. One or more embodiments also determine timestamps for the plurality of stroke points that indicate drawing times associated with the stroke points. By generating the animation element to include stroke point information and drawing time information for each stroke from the digital drawing input stream, one or more embodiments create a reusable and modifiable animation element.

Additionally, the systems and methods allow for easy insertion and reuse of a previously generated animation element. Specifically, one or more embodiments store previously generated animation elements so that a user can insert the animation elements into a user interface. For example, one or more embodiments receive a selection to insert an animation element into a user interface. One or more embodiments then insert the animation element with stored drawing time information and stroke point information into the user interface. The information stored with the animation element provides flexibility for the systems and methods to allow users to reuse the animation element in different project interfaces and with different applications.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 2A-2D illustrate schematic diagrams of strokes and stroke points in an animation element in accordance with one or more embodiments;

DETAILED DESCRIPTION

Figure 1A:
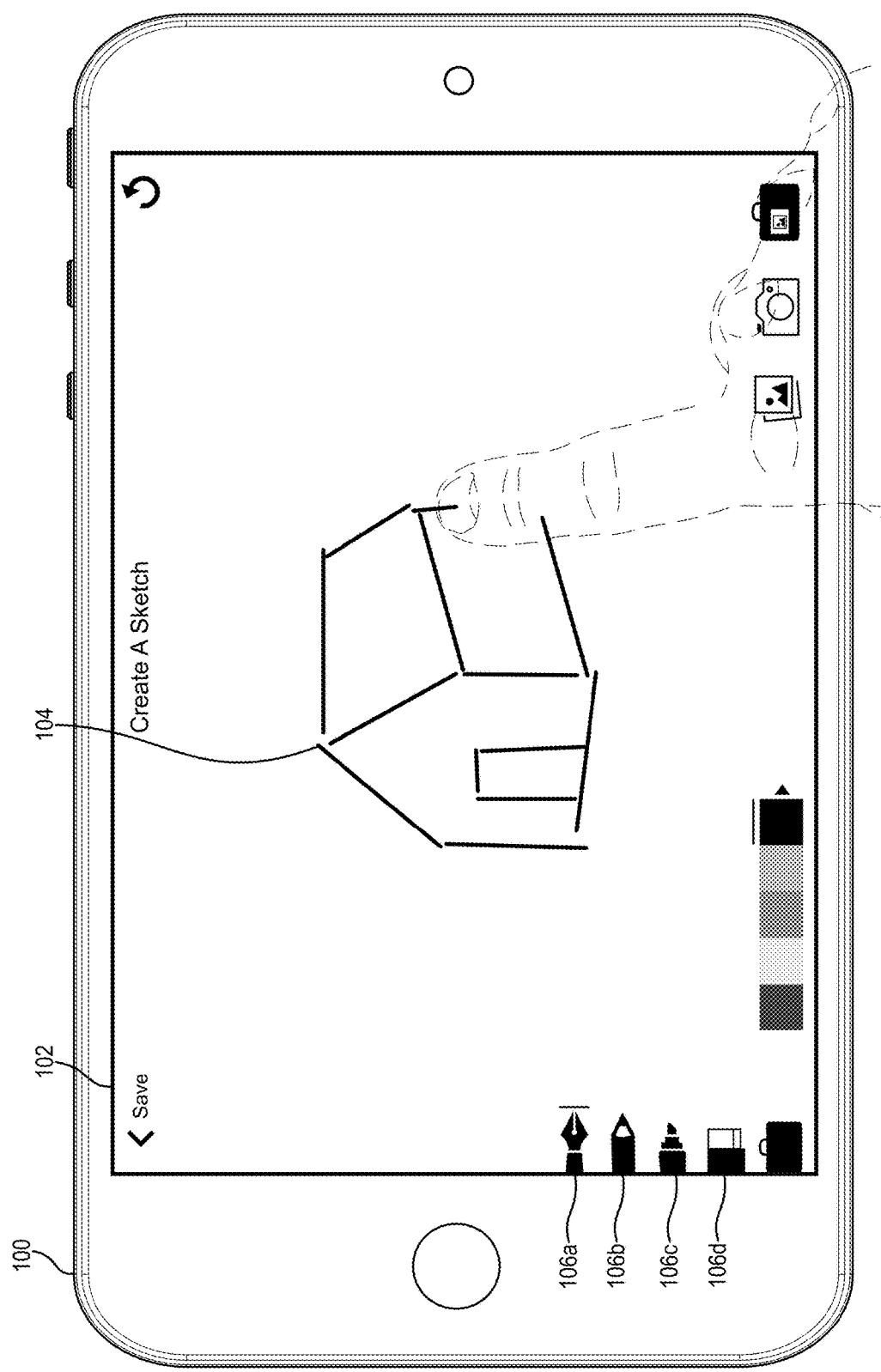
FIGS. 1A-1C illustrate graphical user interfaces for creating animation elements in accordance with one or more embodiments.

One or more embodiments of the present disclosure include a graphic design system that generates reusable animation elements. Specifically, the graphic design system allows a user to input a drawing stream to create a reusable animation element. In one or more embodiments, the graphic design system detects a digital drawing input stream that includes a plurality of strokes. The graphic design system determines characteristics of the strokes including stroke point information and drawing time information. By analyzing the stroke point information and drawing time information for each stroke, the graphic design system is able to generate an animation element from the digital drawing input stream.

Additionally, the graphic design system allows a user to reuse previously generated animation elements across different projects and/or different applications. In particular, one or more embodiments of the graphic design system provide a user interface in which a user can select one or more stored animation elements. After receiving a selection of an animation element, the graphic design system inserts the animation element into the user interface (e.g., into a project or other document including a drawing canvas) with the stored stroke point information and drawing time information. Because the graphic design system stores the stroke point information and drawing time information with the animation element, the graphic design system provides a reusable animation element that users can insert into the user interface as a selectable, moveable, and/or modifiable element.

In one or more embodiments, the graphic design system allows a user to create and store a digital design as an animation element using a computing device. Specifically, the graphic design system detects a digital drawing input stream based on user input within a user interface. For example, the graphic design system identifies a plurality of strokes from the digital drawing input stream within the user interface. As part of identifying each stroke from the plurality of strokes, the graphic design system also identifies a plurality of stroke points that define a stroke path for the corresponding stroke.

According to one or more embodiments, the graphic design system processes the plurality of strokes from the digital drawing input stream. In particular, the graphic design system determines the stroke points for a stroke by extracting Bezier curves based on input points from the input stream. Additionally, one or more embodiments of the graphic design system further smoothens the plurality of strokes using a moving window (or moving average) algorithm. By determining the stroke points using Bezier curves based on the input points from the input stream and applying a moving average algorithm, the graphic design system can create a smooth digital drawing even if the input stream is not smooth.

Furthermore, one or more embodiments of the graphic design system reduce the amount of information for storing with the digital drawing. For example, the graphic design system reduces a number of stroke points for one or more strokes in the digital drawing. To illustrate, the graphic design system reduces a density of stroke points using a point density reduction algorithm that removes one or more stroke points from one or more strokes. By removing stroke points, the graphic design system can limit the storage space and/or drawing time associated with the digital drawing while also providing a reusable animation element that matches or closely matches the original input.

One or more additional embodiments of the graphic design system determines drawing time information for the plurality of strokes in the digital drawing. Specifically, the graphic design system determines a timestamp for each stroke point in the plurality of strokes to determine how quickly the graphic design system animates the digital drawing. For example, the graphic design system determines and assigns timestamps to each stroke point to create a smooth drawing time for animating the digital drawing. To illustrate, the graphic design system generates timestamps for stroke points based on the distances between the stroke points.

Because the graphic design system stores stroke point information and drawing time information as metadata with an animation element, users are able to reuse the animation element across a plurality of different projects, documents, and/or applications. For example, the graphic design system allows a user to insert animation element(s) into a user interface by selecting the animation element(s) from a database of stored animation elements. The graphic design system then inserts the animation element(s) with the stored stroke point information and drawing time information. Thus, selecting an option to play the animation element(s) redraws the animation element according to the associated stroke point information and drawing time information.

In one or more embodiments, the graphic design system allows a user to configure one or more aspects of an animation element after inserting the animation element into a user interface. In particular, the graphic design system allows a user to modify one or more visual characteristics of the animation element within the user interface. For example, a user may modify a color or width of a stroke, a drawing speed associated with the stroke, or a size of the animation element. Thus, the user may tailor the animation element to the particular project and/or application in a variety of ways.

Figure 1B:
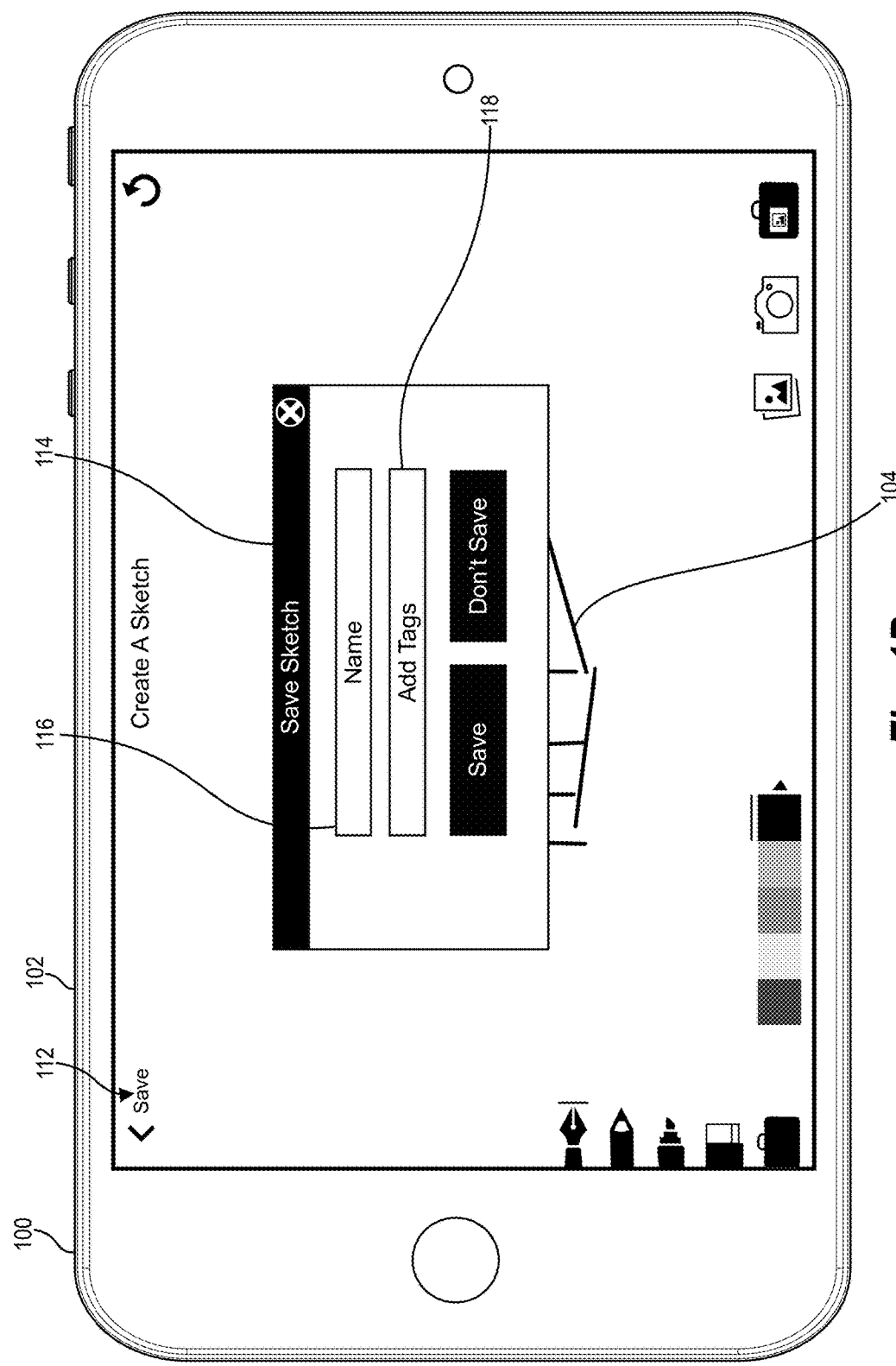
Figure 1C:
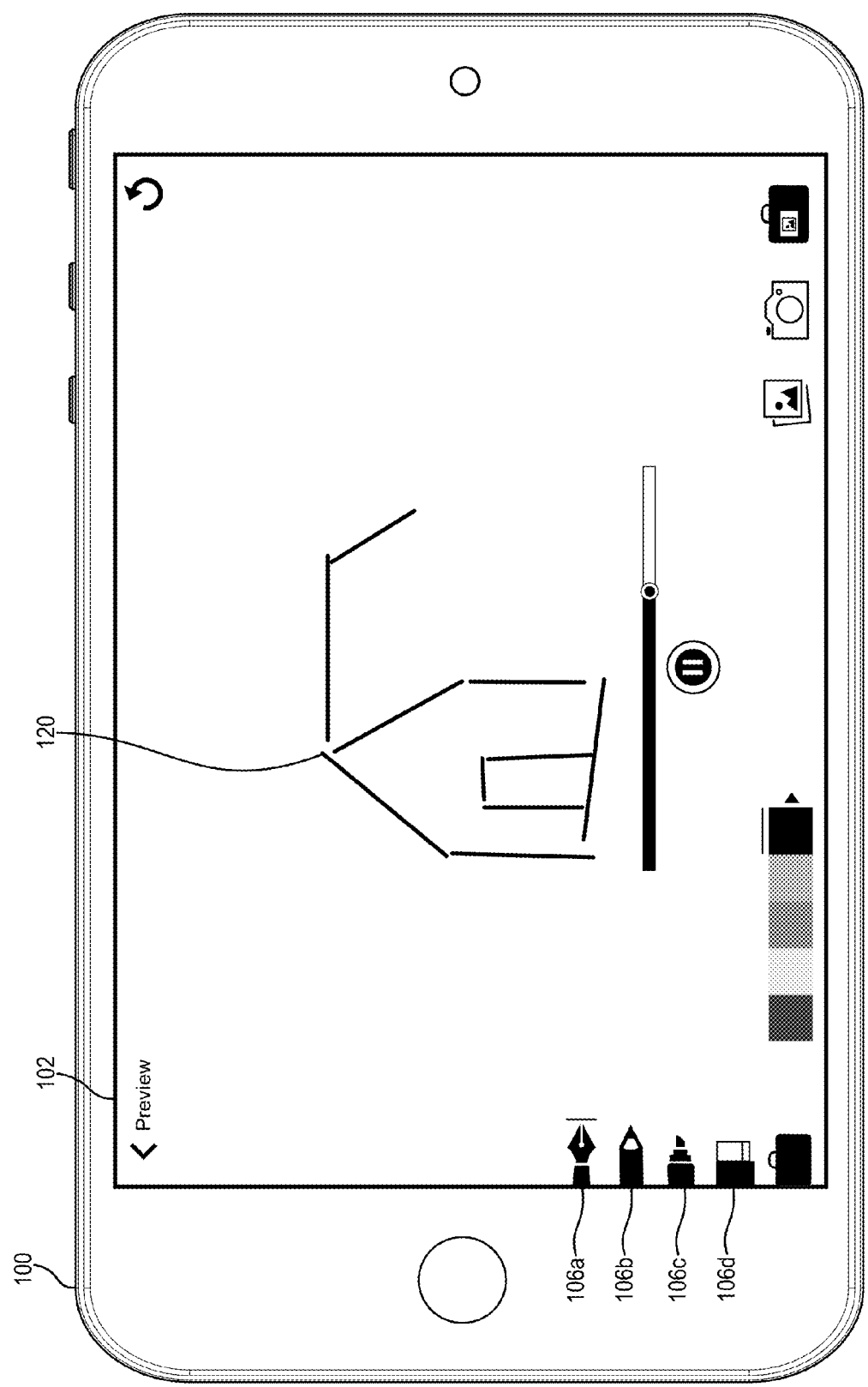

FIGS. 1A-1C illustrate embodiments of a client device 100 including a graphical user interface (or "user interface") 102 in which a user can create an animation element. As used herein, the term "animation element" refers to a selectable element that includes information that allows for reproducing a digital drawing. Specifically, an animation element can include metadata that allows the graphic design system to draw strokes in a digital drawing in response to a selection to play the animation element. For example, an animation element has metadata that includes stroke point information and drawing time information that determines when to draw each stroke point in each stroke relative to other stroke points in the animation element. The graphic design system can store an animation element with the associated metadata in a unique file that is usable in compatible applications.

Specifically, the graphic design system allows a user to provide input via a user interface to create a digital drawing 104. In other words, the user can use a finger or other tool to draw strokes to create a drawing. For example, FIG. 1A illustrates the user providing user input via a touch screen to draw a plurality of lines to form a drawing of a house.

The graphic design system captures the user input as a digital drawing input stream ("input stream"). As used herein, the term "digital drawing input stream" refers to a digital input that a computing device captures in response to user input provided to draw a design using an input device. For example, a mouse, stylus, finger, or other input device can provide input that is captured as a digital drawing input stream. A digital drawing input stream can include a time-dependent sequence of stroke points that result in a stroke(s) in a design. The graphic design system can receive and process strokes from a digital drawing input stream in real-time as a user draws a design using an input device.

The graphic design system detects the input stream and presents a digital drawing 104 corresponding to the input stream in the user interface 102. In one or more embodiments, the user interface 102 is part of a graphic design application. The user interface 102 may be a drawing interface or design creation interface within an application (e.g., a canvas) that allows users to create drawings or produce other types of content. For example, a user may create a project for creating content within the user interface 102 and storing the content in one or more documents associated with the application. Additionally, the application may be part of a suite of applications for designing content and using designed content, each application including one or more user interface 102s for managing, manipulating, editing, duplicating, and/or otherwise utilizing digital content.

In one or more embodiments, the user interface 102 includes a toolbox with a plurality of design tools. Specifically, the toolbox includes a plurality of tools for creating and/or modifying digital content within the user interface 102. For example, the toolbox includes a plurality of drawing tools for creating line drawings, the plurality of drawing tools including a pen tool 106a, a pencil tool 106b, and a marker tool 106c. The various drawing tools modify an appearance of the strokes (e.g., the shape and/or texture) that a user draws within the user interface 102. Additionally, the toolbox may include an eraser tool 106d to erase strokes that a user has previously drawn in the user interface 102.

As used herein, the term "stroke" refers to a drawn line that extends from a first point to a second point. A stroke can be any shape (e.g., a straight line, curved line, and/or combination of curves) as determined by the input from an input device. Additionally, a stroke can pass through one or more additional points between the first point and the second point. For example, a stroke can include a stroke that begins when an input device begins drawing at the first point and stops drawing at the second point. In one or more embodiments, a stroke includes a plurality of stroke points on the stroke that correspond to one or more input points in the digital drawing input stream from the input device. Additionally, a digital drawing can include a plurality of strokes including varying numbers of stroke points.

FIG. 1B illustrates an embodiment of the user interface 102 for generating an animation element from the digital drawing 104. Specifically, after a user creates the digital drawing 104, the graphic design system allows the user to create an animation element (e.g., an element that animates the digital drawing 104 based on how the user drew the digital drawing 104) by selecting an option 112 to save the digital drawing 104 as an animation element. After the user selects the option 112 to save the digital drawing 104 as an animation element, the user interface 102 displays a save dialog 114. The save dialog includes a name option 116 to apply a name to the animation element and a tag option 118 to apply one or more metadata tags to the animation element.

After the user gives the animation element a name and applies any desired metadata tags to the animation element, the graphic design system stores the digital drawing 104 as a reusable animation element. In one or more embodiments, the graphic design system stores the animation element in a unique animation file for importing into one or more compatible applications. The graphic design system may assign a name to the animation file based on the name of the animation element or based on manual input from the user.

Additionally, the graphic design system may store the animation file in a default location or in a location that the user specifies. In one or more embodiments, the graphic design system stores the animation file in a location that one or more applications recognize as a source for obtaining animation elements. For example, the graphic design system stores the animation file in an animation database accessible to one or more applications. To illustrate, applications in a suite of related applications recognize the animation database and allow users to access animation elements stored in the animation database.

FIG. 1C illustrates an embodiment of the user interface 102 for playing an animation 120 corresponding to the digital drawing 104. Specifically, one or more embodiments of the graphic design system allow a user to animate the digital drawing 104 within the user interface 102. For example, the user interface 102 can allow the user to play the animation 120 of the digital drawing 104 by selecting an option to play the animation.

Playing the animation 120 associated with the digital drawing 104 causes the graphic design system to redraw the digital drawing 104 in the same order that the user drew the digital drawing 104. To illustrate, when the user selects an option to play the animation 120 of the digital drawing 104, the graphic design system identifies a plurality of strokes in the digital drawing 104. The graphic design system also identifies a plurality of stroke points associated with each stroke in the digital drawing 104, a drawing order of the identified stroke points (e.g., a start point, an end point, and intermediate points), as well as a drawing order of the plurality of strokes. Thus, the graphic design system redraws the digital drawing 104 within the user interface 102 in the order in which the graphic design system received data in the digital drawing input stream.

Additionally, the graphic design system can determine a drawing time of the animation 120 of the digital drawing 104. In one or more embodiments, the graphic design system determines the drawing time for the animation 120 of the digital drawing 104 in the user interface based on the digital drawing input stream. For example, the animation 120 of the digital drawing 104 may play at the same speed that the user drew the digital drawing 104. Alternatively, the graphic design system may determine the drawing time for the animation 120 of the digital drawing 104 by assigning drawing times for the plurality of strokes to produce a consistent, smooth drawing time. Additionally, the graphic design system may allow the user to select an original drawing time or a smooth drawing time, as may serve a particular embodiment.

As briefly described above, the graphic design system generates an animation element from a digital drawing. FIGS. 2A-2D illustrate a series of diagrams associated with processing strokes in a digital drawing to generate an animation element. Specifically, the graphic design system analyzes and processes the strokes in the digital drawing while the user is drawing and/or after the user is drawing in the user interface to optimize the digital drawing for storing as an animation element. For example, the graphic design system analyzes the input stream as the user is drawing to perform one or more optimization steps on the input stream. In another example, the graphic design system analyzes the completed digital drawing to perform one or more optimization steps after the user is finished drawing (e.g., when the user saves the digital drawing as an animation element).

Figure 2A:
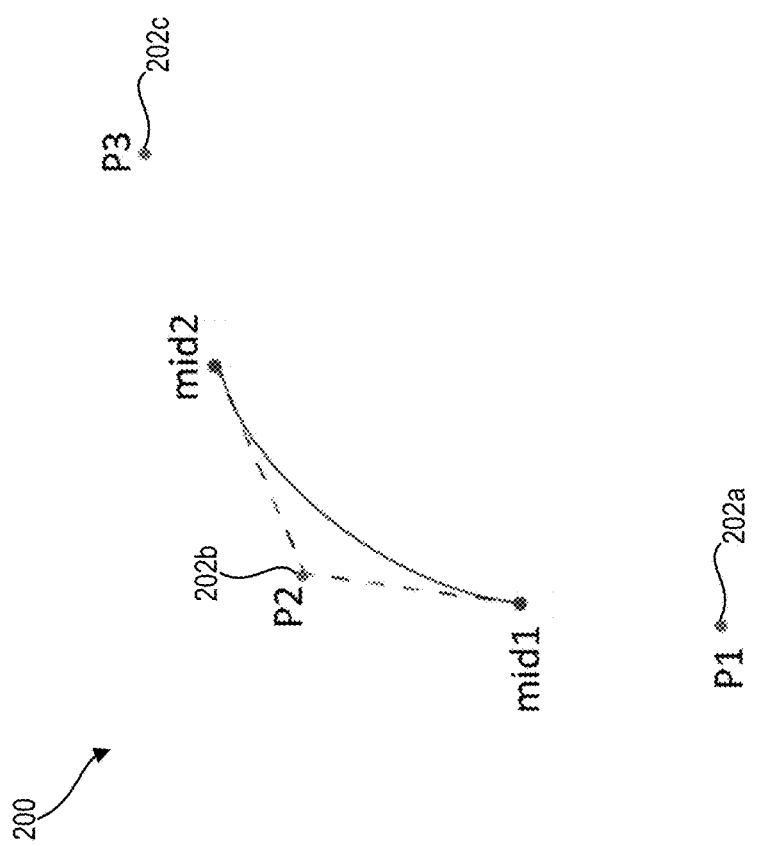

As mentioned, the graphic design system may perform one or more processing operations as the graphic design system receives the input stream. In one or more embodiments, the graphic design system detects input points from the input stream and converts the input points into a plurality of stroke segments. FIG. 2A illustrates a stroke segment 200 extracted from a plurality of input points in an input stream. Specifically, the graphic design system extracts at least one stroke segment from the input points to form a stroke, and a plurality of strokes to form a completed digital drawing.

In one or more embodiments, the graphic design system extracts the plurality of stroke segments using Bezier curves. Specifically, the graphic design system identifies a plurality of points including a beginning point and an end point, and generates a smooth stroke segment from the beginning point to the end point. Additionally, the graphic design system generates the stroke segment based on any input points between the beginning point and the end point. For example, the graphic design system uses an algorithm for forming a Bezier curve to create a path corresponding to the plurality of input points from the beginning point to the end point.

In one or more embodiments, the graphic design system uses quadratic Bezier curves to form the stroke segments in the plurality of strokes. Specifically, a quadratic Bezier curve creates a path given three input points (i.e., a first point 202a, a second point 202b, and a third point 202c), as illustrated in FIG. 2A. For example, the graphic design system identifies a plurality of input points from the input stream. Alternatively, as mentioned, the graphic design system can identify stroke points from the completed digital drawing. Although the embodiment of FIG. 2A illustrates a quadratic Bezier curve method, the graphic design system may use another method of generating the strokes and/or stroke segments, such as by using cubic Bezier curves, linear Bezier curves, and/or straight lines as may serve a particular implementation.

In one or more embodiments, the graphic design system maintains an array of touch points for each stroke. In particular, each array includes a plurality of points identified from a start of the input stream to the end of the input stream for the corresponding stroke (e.g., from touch start to touch end when using a touchscreen). The graphic design system pushes each input point (e.g., touch point) in the period from the start of the input stream to the end of the input stream into the array. For example, the graphic design system may store the stroke points as an array (e.g., a first in, first out array) that allows the graphic design system to identify a chronological order of the input points. Additionally, the graphic design system can store each input point as a combination of x-coordinate and y-coordinate with respect to the canvas or other drawing interface in which the user creates the digital drawing.

After storing the input points for a stroke in an array, the graphic design system creates paths for each stroke segment of the stroke. Specifically, the graphic design system creates a plurality of paths for a stroke segment by first identifying three consecutive points. For example, the graphic design system identifies a first point 202a, a second point 202b, and a third point 202c, as illustrated in FIG. 2A. The first point 202a, second point 202b, and third point 202c represent touch points or movement points corresponding to an input path of the input device according to a chronological order of the input points.

After identifying the three consecutive points, the graphic design system calculates a first midpoint for a path between the first point 202a and the second point 202b, and a second midpoint for a path between the second point 202b and the third point 202c. Specifically, the graphic design system identifies midpoints for constructing paths to use in creating the Bezier curve. For example, the graphic design system uses the calculated midpoints as a beginning point and an end point for drawing the Bezier curve, forming the stroke segment 200. Additionally, the graphic design system uses the second point as a control point to determine how sharply to draw the Bezier curve from the first midpoint to the second midpoint.

In one or more embodiments, the graphic design system determines whether the array includes additional input points that do not correspond to a completed Bezier curve. If the array does not have any additional input points, the graphic design system completes the stroke by drawing stroke segments from the midpoints to the input points or vice versa. If the array has additional input points, the graphic design system draws a stroke segment from the first point to the first midpoint, and then processes three input points including the second point, the third point, and a fourth point that sequentially follows the third point in the array. Thus, the graphic design system continues drawing Bezier curves for each set of three input points until all of the input points in the array are processed. After processing all of the input points in the array, the graphic design system finishes drawing the stroke and continues with additional strokes, as may serve a particular embodiment.

According to one or more embodiments, the graphic design system also smoothens the plurality of strokes in the digital drawing. FIG. 2B illustrates a smoothening process for smoothening an original stroke 204a in a digital drawing while the user draws the digital drawing. In particular, the graphic design system smoothens the original stroke 204a to correct imprecise movements from the input stream and/or to create a consistent, smooth appearance of the digital drawing. For example, a user may be unable to maintain a steady hand while drawing one or more strokes of a digital drawing, causing strokes to include inadvertent and/or irregular movement. Additionally, one or more strokes may include jittery transitions or movements due to inaccuracies in the detection of the input stream from the input device. By smoothening the plurality of strokes in the digital drawing, the graphic design system may minimize and/or remove errors in the final path of each stroke.

As illustrated, the original stroke 204a includes a plurality of stroke points that the graphic design system has drawn in accordance with a plurality of input points from an input stream. For example, the graphic design system draws a plurality of stroke segments using a plurality of Bezier curves. Because the input points do not follow a smooth path, however, the original stroke 204a also does not follow a smooth path. To illustrate, the original stroke 204a includes bumps or jitter that result in a roughly drawn stroke, or along a path other than what a user intended.

According to one or more embodiments, the graphic design system applies an algorithm to the original stroke 204a (e.g., to the input points from the input stream) to create a smoothened final stroke 204b for the digital drawing. Specifically, the graphic design system smoothens the original stroke 204a by applying a moving average algorithm to the original stroke. For example, the moving average algorithm takes the stroke points from the original stroke 204a and averages the relative positions of the stroke points. FIG. 2B also illustrates a comparison 204c of the original stroke 204a to the final stroke 204b during processing using the moving average algorithm. As the moving average algorithm processes the original stroke 204a, the graphic design system adjusts a position of one or more stroke points to smoothen the path of the stroke and redraws the stroke based on the repositioned stroke point(s), resulting in the final stroke 204b.

In addition to smoothing the plurality of strokes in a digital drawing, the graphic design system can also optimize the stroke point density in a digital drawing. In particular, optimizing the stroke point density allows the graphic design system to reduce the total number of stroke points in a stroke while maintaining a shape of the stroke. Reducing the number of stroke points in a stroke reduces the amount of data required to be stored and improves the speed at which the graphic design system is able to draw an animation element created from the digital drawing. A higher number of stroke points increases the amount of data required to store the digital drawing and hinders the animation speed due to the need by the graphic design system to identify each stroke point and its associated data and render the strokes based on each of the identified stroke points.

Figure 2C:
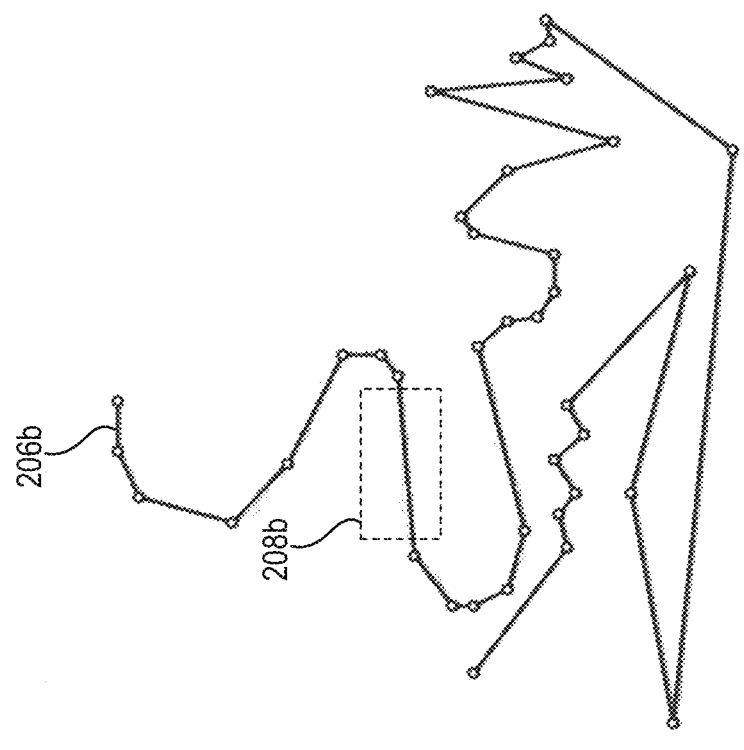
Figure 2C:
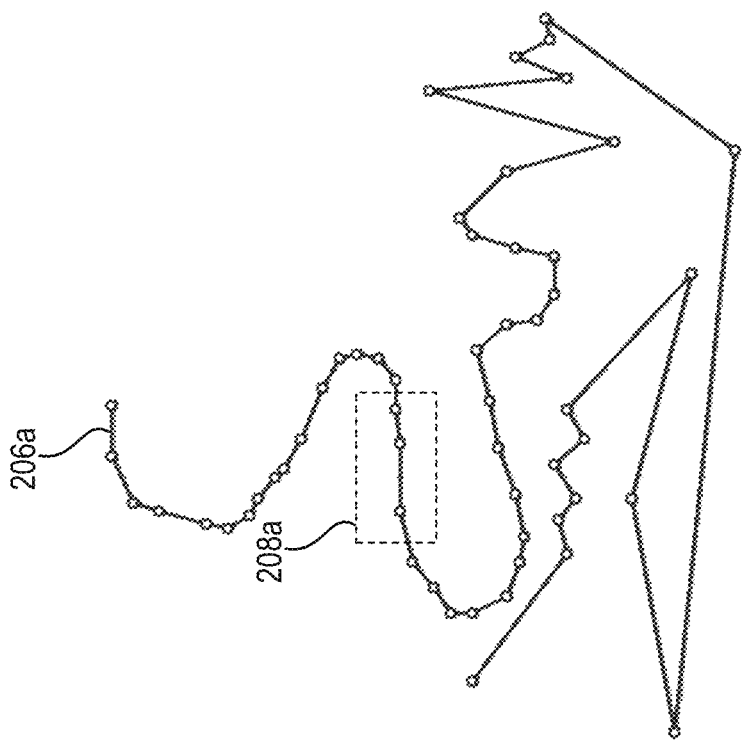

FIG. 2C illustrates an input stroke 206a with a plurality of stroke points and an output stroke 206b with a reduced stroke point density. As illustrated, the graphic design system reduces the stroke point density of the input stroke 206a without significantly changing a shape or path in the output stroke 206b. In one or more embodiments, the graphic design system reduces the stroke point density using a point density reduction algorithm. For example, the graphic design system can use the Ramer-Douglas-Peucker algorithm for reducing the number of points in a curve or stroke. Alternatively, the graphic design system can use one or more other point density reduction algorithms for reducing the stroke point density in the stroke and improving the performance of a corresponding animation element. FIG. 2C highlights a segment 208a of the input stroke 206a and a segment 208b of the output stroke 206b to demonstrate that the graphic design system reduces the stroke point density.

According to at least some embodiments, the graphic design system also determines a drawing time of the animation element. Specifically, the graphic design system determines timestamps for each of the stroke points in each stroke of the animation element. For example, the graphic design system determines timestamps that indicate when to draw each stroke point relative to a previously drawn stroke point. To illustrate, storing a plurality of stroke points for a stroke in an array allows the graphic design system to identify a drawing order of the stroke points. After drawing a first point in the array, the timestamp associated with the subsequent stroke point in the array determines how quickly the graphic design system draws a stroke segment connecting the first point to the second point.

In many instances, original timestamps associated with input points in a digital drawing input stream are irregular. For example, a user creating a digital drawing may draw slowly in some areas of the digital drawing and quickly in others, resulting in an inconsistent and irregular drawing time for the digital drawing. Additionally, different users typically have different drawing styles, which may result in very different drawing times from one animation element to another. One or more embodiments of the graphic design system assign timestamps to one or more stroke points in animation elements to create a smooth and consistent drawing time within a single animation element and across a plurality of animation elements.

Figure 2D:
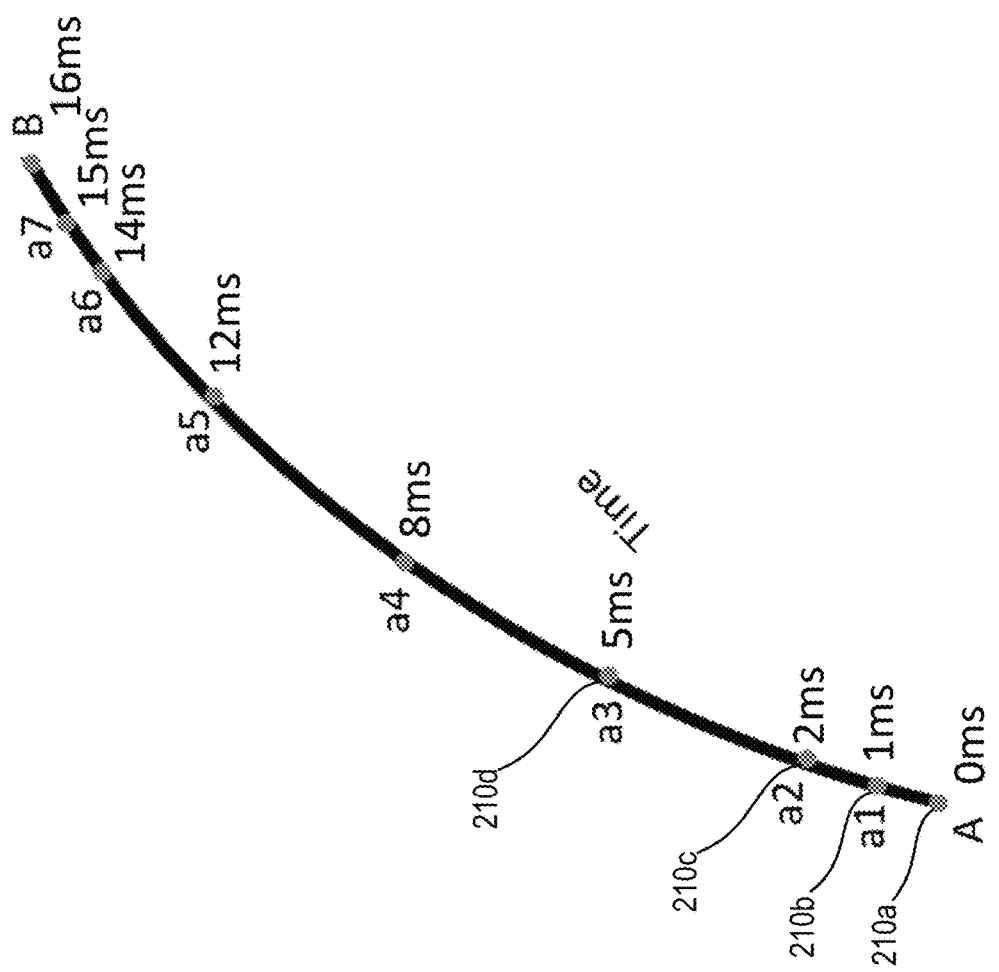

FIG. 2D illustrates a stroke including a plurality of stroke points with associated timestamps. After performing one or more operations to modify and/or optimize the stroke and corresponding stroke point information, the graphic design system can also assign or modify drawing time information associated with the stroke. In particular, the graphic design system determines a timestamp for each stroke point in a stroke array for the stroke, the timestamps indicating how quickly the graphic design system draws the stroke through each stroke point when animating the corresponding animation element.

In one or more embodiments, the graphic design system assigns the timestamps to the stroke points based on a distance between each stroke point. For example, the graphic design system determines a distance between a first stroke point 210a and a second point 210b in the stroke and assigns a timestamp to the first point 210a and the second point 210b based on the determined distance. The graphic design system repeats the process with each stroke point in the stroke by assigning timestamps based on the distance between each stroke point and a previous stroke point. To illustrate, the graphic design system assigns timestamps for the first stroke point 210a, the second stroke point 210b, a third stroke point 210c, and a fourth stroke point 210d in the stroke of FIG. 2D to be 0 milliseconds (ms), 1 ms, 2 ms, and 5 ms, respectively. By assigning timestamps for each stroke point based on the distance between consecutive stroke points, the graphic design system produces a stroke with a smooth, consistent drawing time.

In one or more alternative embodiments, the graphic design system uses other drawing time information, such as real-time time information from the input stream. In particular, a user may select to use the drawing time from the input stream as the drawing time information for the animation element. For example, a user may desire to draw strokes from an animation element at different speeds to achieve a certain effect. Thus, the user may select an option to use the original drawing time information, rather than assigning timestamps based on distances between stroke points.

In one or more embodiments, the graphic design system also stores additional stroke information for the digital drawing. Specifically, the graphic design system stores color information, stroke width information, and/or size information for the digital drawing. For example, the graphic design system can assign separate color information for one or more strokes in the digital drawing, separate width information for one or more strokes in the digital drawing, and size information for the digital drawing.

As mentioned, the graphic design system can create an animation element from a digital drawing input stream of a user by analyzing and processing the input points from the input stream. Specifically, one or more embodiments of the graphic design system first extract strokes from an input stream. According to one implementation, the graphic design system uses quadratic Bezier curves to extract a plurality of strokes from the input stream. To illustrate, the graphic design system creates a path according to the steps for creating a stroke using quadratic Bezier curves, as described below.

Step 1: Staring from a first point in an array of points corresponding to a stroke, take 3 consecutive points as an input starting with a first point—the first point represented as $p_1$; a second point represented as $p_2$; and a third point represented as $p_3$.

Step 2: Calculate the midpoint, $mid_1$, of the first point and the second point as $mid_{1x}=(p_{1x}+p_{2x})/2$; and $mid_{1y}=(p_{1y}+p_{2y})/2$, where x represents an x-coordinate and y represents a y-coordinate for the midpoint.

Step 3: Calculate the midpoint, $mid_2$, of the second point and the third point as $mid_{2x}=(p_{2x}+p_{3x})/2$; and $mid_{2y}=(p_{2y}+p_{3y})/2$.

Step 4: Draw a quadratic Bezier curve with $mid_1$ as the beginning point, mid2 as the end point, and $p_2$ as the control point.

Step 5: Check if there are more points in the array that are unprocessed.

Case 1: If there are no more points, proceed to Step 6.

Case 2: If there are more points, move to the second point and take 3 consecutive points—the second point represented as $p_1$; the third point represented as $p_2$; and a fourth point represented as $p_3$ as an input and repeat Step 2 through Step 5.

Step 6: End.

After extracting the plurality of strokes from the input stream, the graphic design system then smoothens the plurality of strokes. As discussed previously, the graphic design system uses a moving average algorithm to smoothen the plurality of strokes in the digital drawing. Specifically, the moving average algorithm creates a stream of moving average stroke points from the input stream rather than using the actual input points from the user. In one or more embodiments, the graphic design system calculates the moving average of each input point by taking an arithmetic mean from an equal amount of data on either side of a particular input point. Variations in the mean are thus aligned with variations in the data. To illustrate, a simple, equally weighted running mean for an n-point sample from the stream of input points in the input stream is given by:

$$SMA[M]=(P[M-(n-1)/2]+P[M-(n-1)/2+1]+ \ldots +P[M]+ \ldots +P[M+(n-1)/2-1]+P[M+(n-1)/2])/n,$$

where SMA represents a calculated simple moving average array, P is an array of input points, M is the index of the point for which the graphic display system is calculating a simple moving average, and n is the size of the moving average window. For example, taking the size of n to be 3, then $$SMA[1]=(P[0]+P[1]+P[2])/3;$$

$$SMA[2]=(P[1]+P[2]+P[3])/3;$$

and so on.

Because the moving average algorithm is fast, the graphic design system can calculate the moving average stroke points in real time from the input stream. Additionally, the resulting stroke is much smoother than the original stroke. A higher value of n results in a smoother stroke. However, a higher n has a tradeoff in lag between the input and drawing the stroke with the calculated stroke points. In particular, drawing each point requires n/2 future points, so increasing n increases the number of future points needed to calculate the moving average of the current stroke point. In one or more embodiments, the graphic design system uses an n of 3, though other values may be appropriate based on the particular embodiment.

Once the graphic design system has smoothened a stroke, the graphic design system can also reduce a density of stroke points in the stroke. Because the density of stroke points depends on how a user draws the stroke (e.g., quickly drawn strokes have low stroke point density and slowly drawn strokes have high stroke point density), the graphic design system can optimize the information stored for the stroke by reducing a density of the stroke points where possible while retaining the shape of the stroke.

In one or more embodiments, the graphic design system applies a stroke point density reduction algorithm to reduce the number of stroke points in the stroke. As previously mentioned, the graphic design system can apply the Ramer-Douglas-Peucker algorithm to the original stroke to find a similar stroke with fewer stroke points than the original stroke. For example, the algorithm defines the stroke based on the maximum distance between the original stroke and the optimized stroke. The optimized stroke includes a subset of the points that defined the original stroke while retaining approximately the same shape as the original stroke. In one or more implementations, the graphic design system identifies an optimized stroke within a threshold maximum distance of the original stroke.

The graphic design system can then determine drawing time information associated with the stroke points in the optimized stroke. In one or more embodiments, the graphic design system creates a uniform drawing time for the plurality of strokes in each stroke of the digital drawing. As mentioned, the graphic design system can assign timestamps to the plurality of strokes based on distances between the stroke points. In one or more embodiments, a formula for determining the timestamps is represented as:

$$T(p_2)=D(p_2-p_1)*t+T(p_1)$$

where $p_1$ and $p_2$ are stroke points, $T(p_2)$ is the time for point $p_2$, D is the perpendicular distance between $p_1$ and $p_2$, and t is a time constant for unit distance.

After the graphic design system determines stroke point information and drawing time information for the digital design, the graphic design system can convert the digital drawing to an animation element. For example, the graphic design system bundles the stroke point information, the drawing time information, and any additional information associated with the digital drawing to form an animation element an independent entity (e.g., a unique animation element file). The animation element file may be tied to a particular format (e.g., a Whiteboard Animation Element or "WA-Element") that is used in one or more different applications capable of reproducing the animation.

In one or more embodiments, the animation element file includes both fixed data and configurable data to allow users to change the animation element as may serve a particular embodiment. Specifically, the animation element file includes a plurality of configurable properties to allow flexibility to change an appearance of the animation element in a document. For example, the animation element file can include a speed factor that governs the speed of the animation. Modifying the speed factor modifies the drawing time information associated with the stroke points. The animation element file may include a size characteristic that determines a size of the whole animation, and modifying the size characteristic modifies the stroke points to create a clean animation without loss of quality. The animation element file may also include color characteristics that determine the color of each stroke independently.

In one or more embodiments, playing an animation of an animation element draws the strokes based on a selected time parameter for the animation element file. In particular, playing the animation causes the graphic design system to draw the plurality of strokes on a canvas or in a document based on the time parameter. For example, the graphic design system starts a timer in response to a request to play the animation and draws stroke points until the time parameter is met. Thus, increasing the time parameter increases the portion of the animation element that the graphic design system is able to draw. Similarly, reducing the time parameter reduces the portion of the animation element that the graphic design system can draw.

According to one or more embodiments, the graphic design system creates the animation element file for a plurality of different applications and/or uses. For example, the graphic design system may convert the animation element in the animation element file to another file format (e.g., a common animated image file or video file). Thus, a plurality of different applications may use and reuse the animation element by importing the animation element file.

Figure 3A:
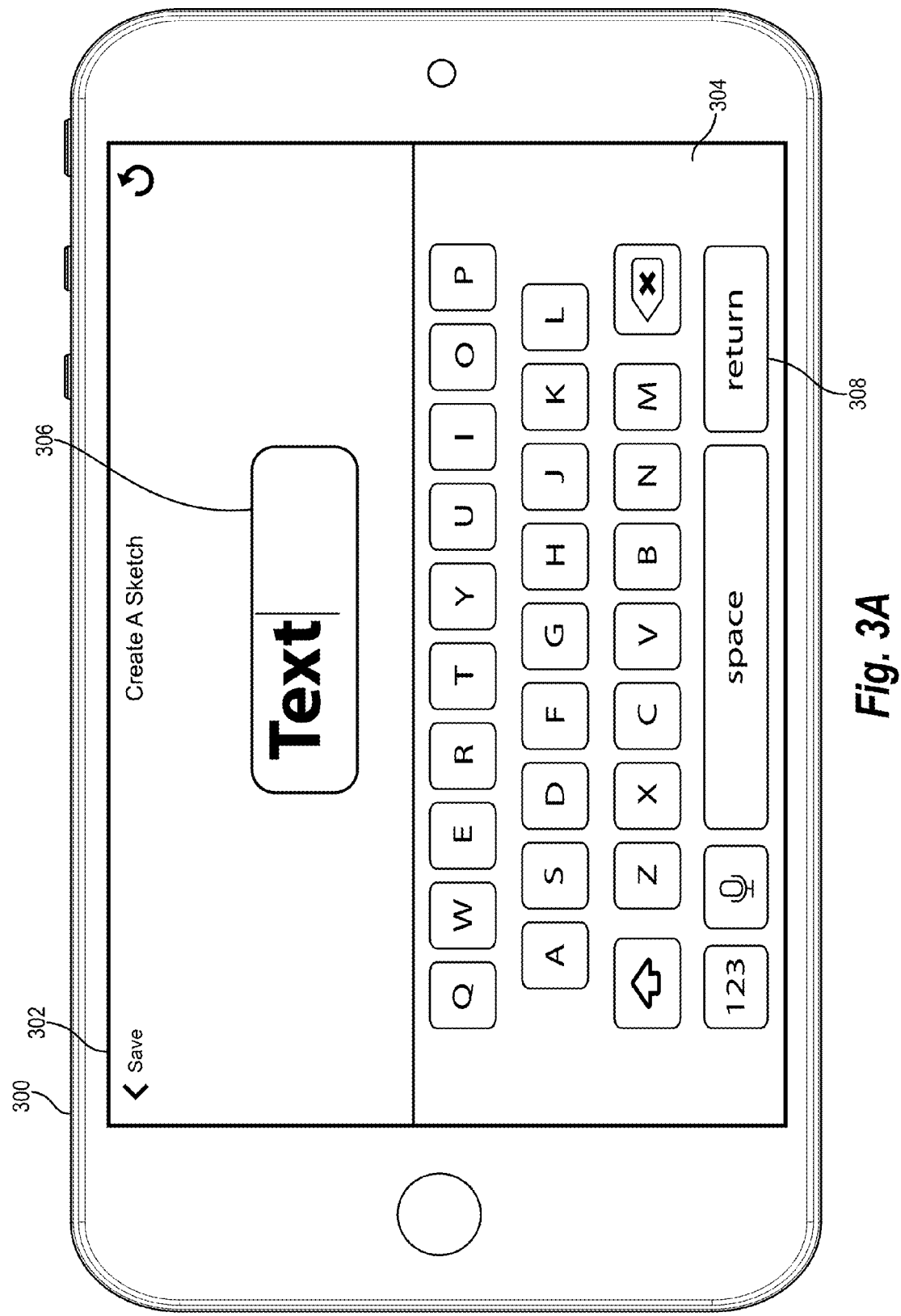
FIGS. 3A-3B illustrate graphical user interfaces for creating text animation elements in accordance with one or more embodiments.
Figure 3B:
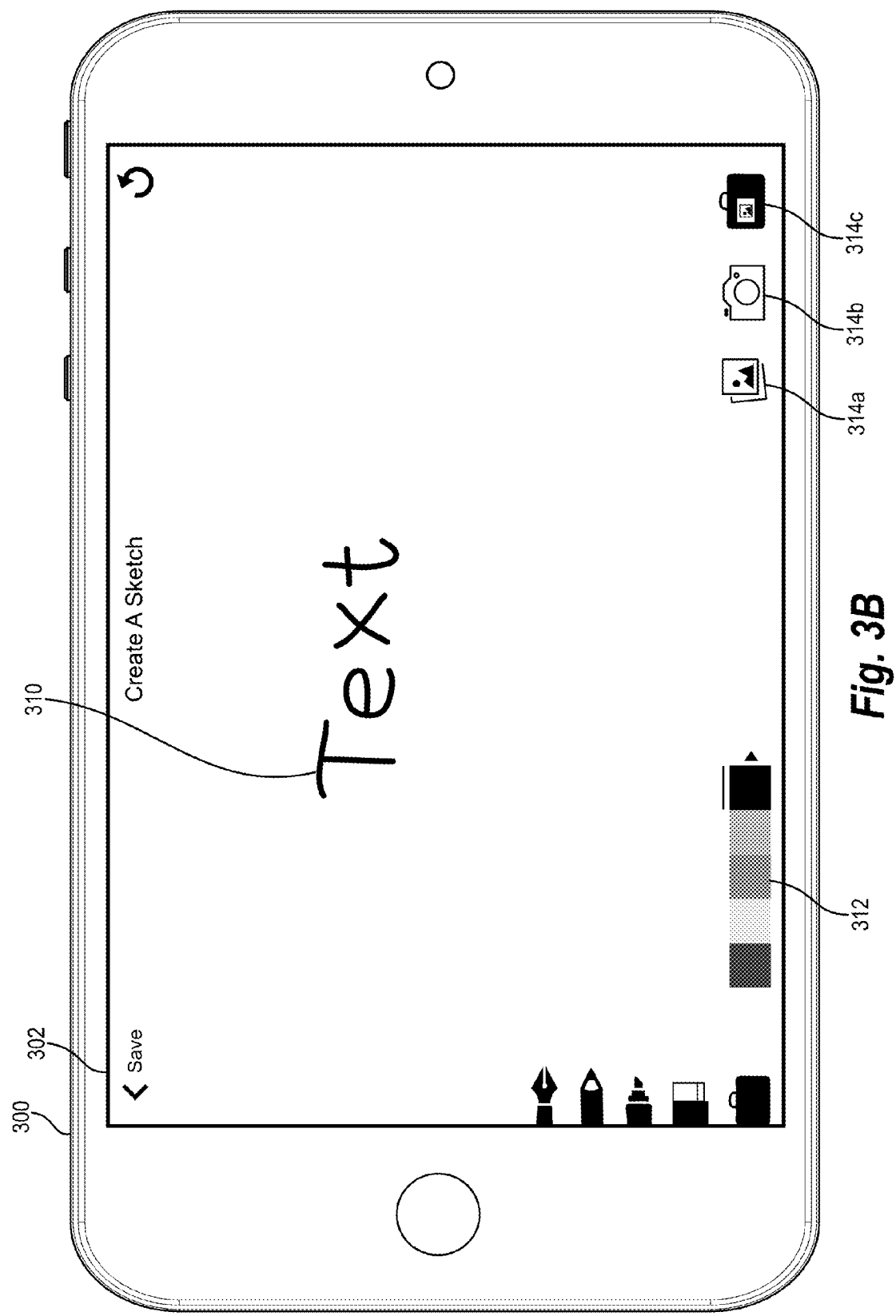

In one or more embodiments, the graphic design system also converts one or more types of inputs into predefined animation elements. Specifically, the graphic design system converts handwritten text or typed text into animated text based on predefined animation character elements. FIGS. 3A and 3B illustrate a client device 300 including a user interface 302 for receiving text input and converting the text input into animation elements. The graphic design system may allow a user to input text and also use a stylus to draw strokes within the user interface 302 to create an animation element that has animation character elements and hand drawn animation elements According to one or more embodiments, the graphic design system allows a user to input text into a user interface 302. For example, the graphic design system displays a keyboard interface 304 that allows a user to type text into a canvas on the client device 300, illustrated in FIG. 3A. Text that the user inputs appears in a text field 306 within the canvas. The user can then enter the text by pressing a "return" key 308 (or "enter" key) on the keyboard interface 304. Alternatively, the user can enter text using a keyboard input device in communication with the client device 300.

In one or more embodiments, the graphic design system detects the text input and converts the text input into an animation element 310, as illustrated in FIG. 3B. Specifically, the graphic design system identifies one or more characters in the text by analyzing the text input. For example, the graphic design system analyzes a text input stream from the input device (e.g., a touchscreen input or a keyboard input) to identify character values associated with the text. To illustrate, the graphic design system recognizes that the user entered "Text" in the text field 306 of FIG. 3A.

The graphic design system can then convert the one or more characters in the text into animation character elements, for example, by comparing the character values of the one or more characters in the text to a table of character values. The graphic design system identifies one or more animation character elements that correspond to the identified character values, and inputs the animation character elements into the canvas in place of the text. In one or more embodiments, the graphic design system uses animation character elements that the user previously created so that the animation character elements match the user's handwriting. In alternative embodiments, the graphic design system uses animation character elements from a shared animation database that a plurality of different users can access.

In one or more embodiments, the animation character elements are stored with corresponding stroke point information and drawing time information. Additionally, the graphic design system allows a user to play an animation that draws the text in accordance with the animation character elements. For example, the graphic design system can combine the stroke point information and drawing time information associated with a plurality of animation characters element into a single animation element 310. To illustrate, the graphic design system identifies a text string based on when a user selects the "return" key in the keyboard interface and combines the animation character elements for the identified text string.

Although FIGS. 3A and 3B illustrate text-to-animation element conversion, the graphic design system is capable of converting other drawings into predefined animation elements. For example, the graphic design system can use image recognition processes to identify shapes (e.g., squares, circles, triangles) and/or objects such as animals, buildings, etc. The graphic design system can then find a previously generated animation element corresponding to the identified shapes. In one or more embodiments, the graphic design system recommends an animation element to the user based on an identified shape in the user interface. Alternatively, the graphic design system can automatically import an animation element based on an identified shape in the user interface.

In one or more embodiments, the user interface 302 includes additional options for use in creating and/or customizing a digital drawing. For example, the user interface 302 includes a color selector tool 312 (e.g., a color palette or color wheel) that allows a user to select a color with which to draw, as illustrated in FIG. 3B. Selecting a color from the color selector tool 312 causes drawn strokes to appear with the selected color. In various implementations, a digital drawing may include a plurality of strokes drawn in the same color or in different colors. To illustrate, a user may select a first color to draw a first stroke and a second color to draw a second stroke. Alternatively, a user may select a single color for drawing a plurality of strokes in the digital drawing.

The toolbox may include additional tools for configuring the appearance of the digital drawing. In particular, the toolbox may include one or more options for configuring an appearance of one or more strokes in the digital drawing. For example, the toolbox may include an option to select a width associated with the selected drawing tool. To illustrate, after selecting a particular drawing tool (e.g., the pen tool), the user interface 302 presents a dialog window that allows the user to select a width of the pen tool. Alternatively, selection of the pen tool causes the user interface 302 to present a plurality of different pen tools with different widths, allowing the user to select the pen tool with the desired width.

In one or more alternative implementations, the graphic design system selects the width of a stroke based on pressure applied on a touchscreen. Specifically, the graphic design system may recognize one or more input devices (e.g., a stylus, digital pen device, or a finger) and detect a pressure of the input device on the touchscreen. Different contact pressures of the input device cause different stroke widths in the digital drawing. For example, applying more pressure to the touchscreen while drawing increases the width of a stroke, while applying less pressure to the touchscreen decreases the width of the stroke. In at least some instances, a single stroke may have varying widths based on varying pressure from the input device.

According to one or more embodiments, the user interface 302 includes additional tools in the toolbox and/or in another dialog window or area of the user interface 302. Specifically, the user interface 302 includes a plurality of additional input tools that allow a user to select additional types of digital content for inputting into the user interface 302. For example, the user interface 302 includes an image tool 314a that allows a user to import images (e.g., photos, clipart, or other digitally generated content) into the user interface 302 for adding to the digital drawing by a user (e.g., as a background). The user interface 302 also includes a photo tool 314b that allows a user to capture a photograph using a digital camera of the computing device to capture an image for importing into the user interface 302. As described in more detail below, the user interface 302 can also include an animation library tool 314c for opening a library of stored animation elements.

In one or more embodiments, the graphic design system allows the user to adjust strokes that the user previously drew in the user interface 302. For example, the graphic design system allows a user to select, move, duplicate, enlarge, or adjust a shape of strokes in the digital drawing. To illustrate, selecting a particular stroke in the digital drawing may also cause the user interface 302 to display one or more anchor points of the selected stroke. The user may adjust a position of one or more anchor points to change a shape, position, or size of the stroke.

Figure 4A:
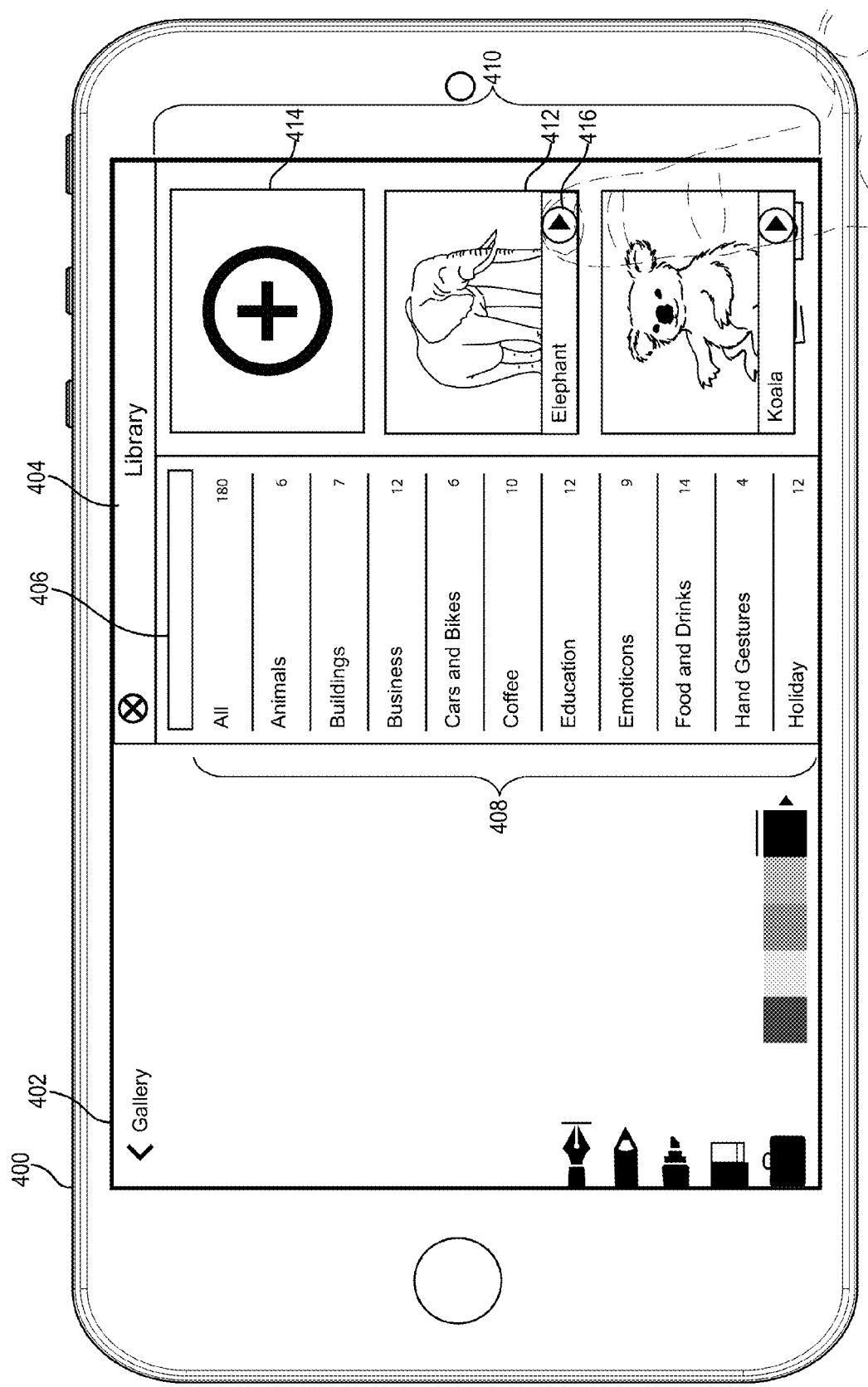
FIGS. 4A-4B illustrate graphical user interfaces for inserting animation elements in accordance with one or more embodiments.
Figure 4B:
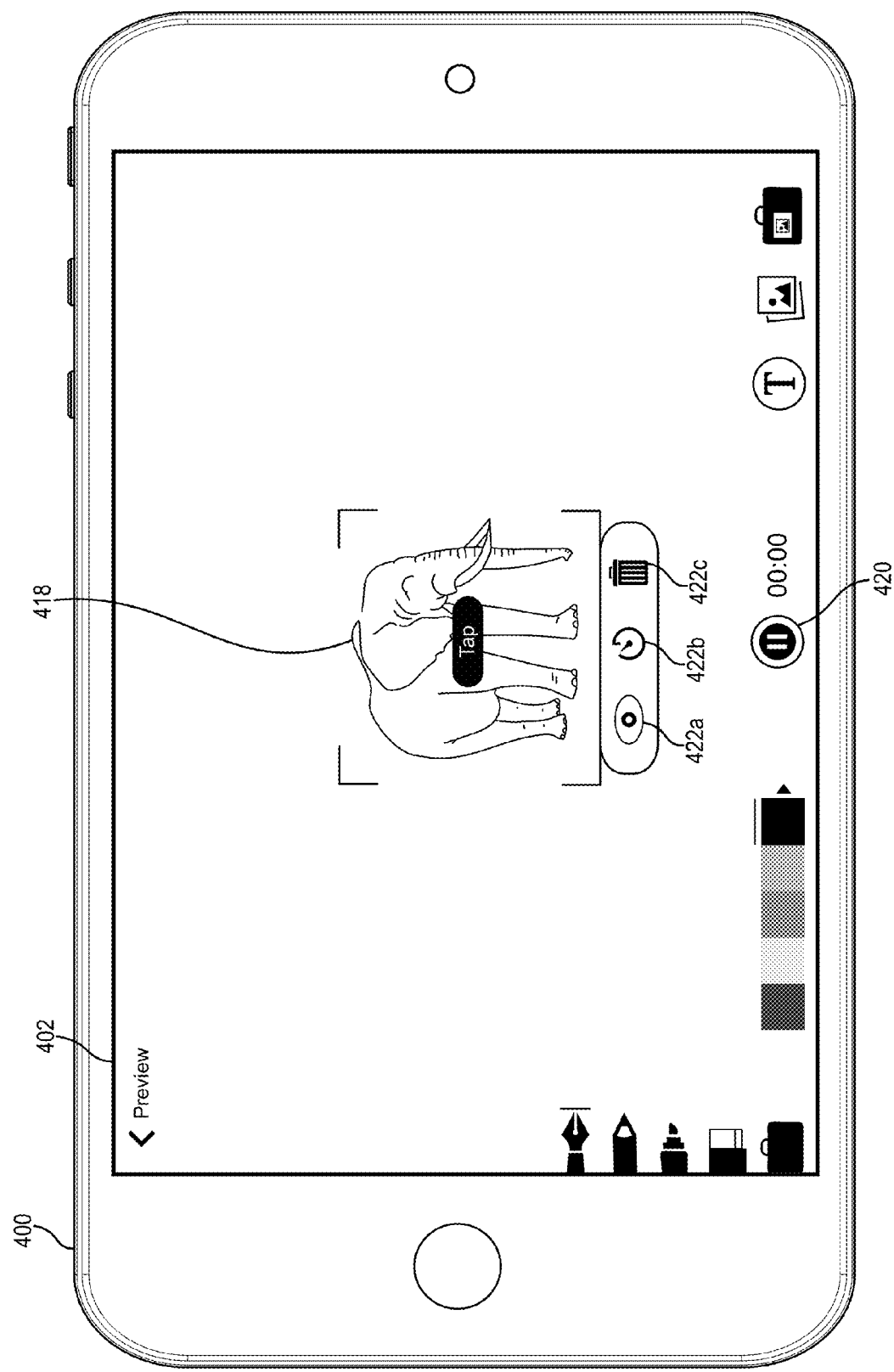

As described previously, the graphic design system allows a user to import animation elements into a variety of applications. Because of the way the graphic design system stores the animation elements (e.g., with stroke point information and drawing time information), the graphic design system allows a user to import the animation elements for replaying and/or modifying within different applications. FIGS. 4A and 4B illustrate an embodiment of a client device 400 including a user interface 402 of an application for importing animation elements. Specifically, after a user saves an animation element in an animation file, the user may use the same application or another application to import the animation element from the animation file into a document.

In one or more embodiments, one or more compatible applications are capable of importing the animation element from the animation file for use in various document types. For example, an application imports the animation element from the animation file for use in a presentation. In another example, an application imports the animation element from the animation file for use in generating a video. The graphic design system may also allow a user to import a plurality of instances of the same animation element or of different animation elements.

FIG. 4A illustrates an embodiment of a user interface 402 for importing an animation element from an animation database of animation elements. In particular, the user interface 402 includes an import dialog 404 for importing one or more animation elements from an animation library or animation database. For example, the user interface 402 opens the import dialog 404 in response to a user selection of the animation library tool 314c, as in FIG. 3B. In one or more embodiments, the import dialog 404 includes a search bar 406, a category section 408, and an animation element list 410. Alternatively, the import dialog 404 may include one or more of the options illustrated in FIG. 4A and/or one or more additional options for aiding a user in importing animation elements into a document.

In one or more embodiments, the user interface 402 includes the search bar 406 for finding an animation element. Specifically, the search bar 406 includes a text field that can receive a text input by a user. For example, selecting the text field using a touchscreen client device can cause the client device to display a keyboard interface by which the user may input text into the text field. After the user enters text into the input field, or as the user enters text into the input field, the import dialog 404 can conduct a search in the animation database for animation elements that match the entered text and present results of the search to the user. Thus, the user may search for keywords (e.g., by name or metadata tag) to find one or more animation elements in the animation database, which may be especially useful if the user knows which animation element the user desires to import.

According to one or more embodiments, the user interface 402 includes the category section 408 for dividing the animation database into a plurality of categories. In particular, the graphic design system divides the animation elements into categories that allow users to more easily find relevant animation elements. For example, the category section 408 may separate the animation elements into categories based on the name and/or metadata tags stored with the animation elements. In various embodiments, an animation element may be in more than one category depending on the name and/or metadata tags associated with the animation element. The graphic design system may also divide the animation elements into categories based on other information associated with the animation elements, including using visual recognition processes to identify objects or other content in the animation elements.

In one or more embodiments, the animation element list 410 of the import dialog 404 allows a user to select an animation element for importing into a document. For example, the animation selection includes a description of each animation element in the animation database. To illustrate, the animation selection displays the name of each animation element entered when a creator of the corresponding digital drawing saved the digital drawing as an animation element. Additionally, the animation element list 410 can display a thumbnail view or preview 412 of each animation element in the animation database.

According to one or more embodiments, the animation element list 410 displays the animation elements based on one or more organization criteria. For example, the graphic design system can organize the animation elements within the animation element list 410 based on creation recency. To illustrate, the most recently created animation elements may be positioned at the top of the animation element list 410 within the import dialog 404. Alternatively, the graphic design system may organize the animation elements based on popularity, number of uses, alphabetically, or a combination of criteria, including popularity or recency of creation within a specific time window (e.g., within the last week or month).

The animation element list 410 can also include an option 414 to create a new digital drawing and/or animation element. In particular, selecting the option 414 to create a new digital drawing/animation element causes the user interface 402 to open a new canvas. When the user interface 402 opens a new canvas, the user can then begin creating a digital drawing, as described in relation to FIG. 1A. After finishing the digital drawing, the user can also export the digital drawing as an animation element, as described in FIG. 1B, and store the animation element in the animation database.

In one or more embodiments, the import dialog 404 includes one or more options 416 to play the animation elements within the animation element list 410. Specifically, FIG. 4A illustrates a play option 416 associated with each element in the animation element list 410. Selecting the play option 416 plays at least a portion of the animation element within the animation element list 410 to allow the user to see how the animation is re-drawn. For example, selecting the play option 416 may cause a few seconds of the animation element to play in the animation element list 410. Alternatively, the play option 416 may play the entire animation element within the animation element list 410.

After identifying an animation element for importing, the user may select the animation element to import into the document. For example, the user selects the animation element by tapping on the animation element in the animation element list 410 within the import dialog 404. In response to the user selecting the animation element in the animation element list 410, the graphic design system imports the animation element into the document. FIG. 4B illustrates an embodiment of the user interface 402 after importing an animation element 418 from the animation database and inserting the animation element 418 into the document.

In at least some implementations, the graphic design system places the animation element 418 within the document at a central position relative to a viewable area in the user interface 402 (e.g., in the center of the screen on the computing device). Alternatively, the graphic design system allows a user to drag the animation element 418 from the animation element list 410 into the document at any position within the viewable area of the user interface 402. In additional embodiments, the graphic design system allows a user to select the animation element 418 after the graphic design system inserts the animation element 418 into the document and reposition the animation element 418 within the document.

In one or more embodiments, the user interface 402 provides a staging area for creating videos or other content.

Specifically, the user interface 402 includes a record option 420 that allows the user to record animation elements as the graphic design system redraws them within the staging area. For example, after a user places one or more animation elements into the staging area, the user can press the record option 420 to begin recording a video capture of the contents of the user interface 402. After selecting the record option 420, the user interface 402 may allow the user to tap on the animation element 418 to begin redrawing the animation element 418 according to stored metadata for the animation element 418. The graphic design system records the animation of the animation element 418 for creating a video of the animation. Selecting the record option 420 again stops the recording.

To illustrate, the user imports a plurality of animation elements into one or more locations in the user interface 402, selects the record option, and then taps one or more of the animation elements to begin animating the animation elements according to a desired animation order. For instance, the user may capture a video recording of an animation of a first animation element and a second animation element by selecting the record option and then tapping on the first animation element and then the second animation element. The resulting video capture depicts the animation of the first animation element and the second animation element in accordance with the selections by the user. Thus, the user may capture a video of a plurality of different animations corresponding to various animation elements in an order and a layout that the user specifies.

In one or more embodiments, the user interface 402 includes a plurality of configuration options for the animation element 418. In particular, the configuration options allow a user to adjust one or more characteristics of the animation element 418 within the document. For example, the user interface 402 includes a visibility option 422a, a drawing time customization option 422b, and a deletion option 422c. The user interface 402 may include one or more additional options that allow the user to modify characteristics of the animation element 418, such as a size option or layering options.

The visibility option 422a may control a visibility of the animation within the document. For example, the visibility option 422a may control whether the animation element 418 appears in the document, such that a user may initially hide the animation element 418 or display the animation element 418. For example, selecting the visibility option 422a may make an animation element 418 or other corresponding element (e.g., a still image) visible in a captured video without requiring the user to tap on the element to play an animation for the element. Alternatively, deselecting the visibility option 422a may cause the animation element 418 to appear only in response to the user selecting the animation element 418 to play the corresponding animation.

In one or more embodiments, the drawing time customization option 422b allows a user to customize the drawing time associated with the animation element 418. In particular, customizing the drawing time allows the user to have greater control over the overall speed at which the graphic design system animates the entire animation element 418. For example, the user may select a slower speed than a default speed associated with the animation element 418, which causes the corresponding animation to be slower than a default animation speed. Alternatively, the user may select a faster speed than the default speed, causing the corresponding animation to be faster than the default animation speed.

According to one or more additional embodiments, the deletion option 422c allows a user to delete the animation element 418 (or other element) from the user interface 402. For example, the user may decide that the animation element 418 does not belong in the user interface 402 and/or desires a different animation element in place of the original animation element 418. In response to a user selection of the deletion option 422c, the graphic display system removes the animation element from the user interface 402 (e.g., from the document).

As mentioned, the graphic design system may also allow a user to modify additional characteristics of animation elements, such as layering of a plurality of elements. Specifically, if the user has imported a plurality of animation elements into a document, and at least one animation element overlaps another animation element or image element, the user may adjust the layering of the overlapping animation element such that the desired animation element is in higher layer (e.g., visible over the top of or in front of one or more other animation elements or image elements). Layering the animation elements provides depth to the overall document and allows the user to control the appearance of animation elements relative to other animation elements or image elements in the document.

In one or more additional embodiments, the graphic design system allows a user to modify a size of the animation element 418. For example, the graphic design system may provide a size option to increase or decrease the size of the animation element 418 relative to its original size. As will be described in more detail below, the graphic design system can modify a size of the animation element 418 due to the types of metadata stored with the animation element 418. In at least some implementations, the graphic design system modifies the animation element 418 in such a way as to allow increasing or decreasing the size of the animation element 418 with little or no effect on the visual quality of the animation element 418. To illustrate, the graphic design system modifies the animation element 418 by redrawing strokes as the user adjusts the size of the animation element 418 based on updated distances of the stroke points relative to other stroke points.

Figure 5:
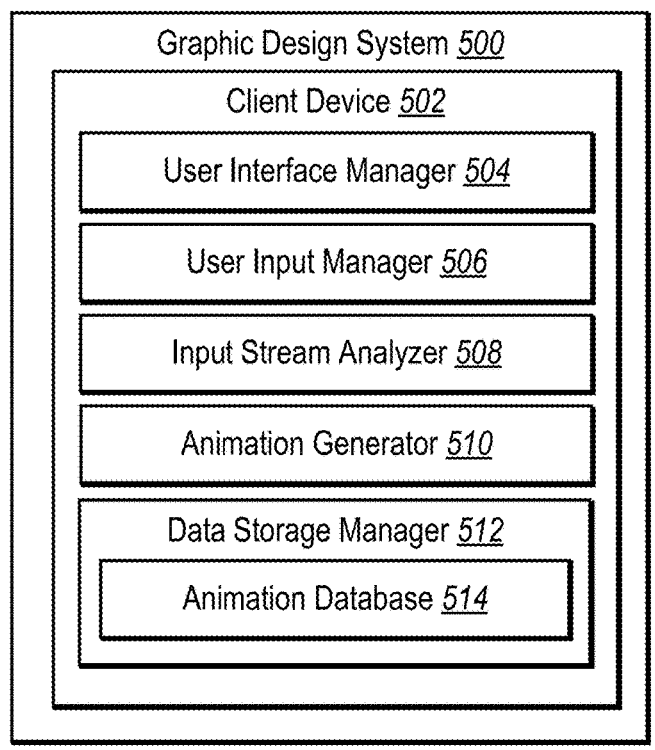
FIG. 5 illustrates a schematic diagram of a client device including a graphic design system in accordance with one or more embodiments.

As described above, a graphic design system can generate animation elements from a digital drawing input stream. FIG. 5 illustrates a schematic diagram of a graphic design system 500 including a client device 502 for performing one or more operations of the graphic design system 500 described herein. The graphic design system 500 can include, but is not limited to, a user interface manager 504, a user input manager 506, an input stream analyzer 508, an animation generator 510, and a data storage manager 512. Although the graphic design system 500 of FIG. 5 is depicted as having various components, the graphic design system 500 may have any number of additional or alternative components. Additionally, although FIG. 5 illustrates the graphic design system 500 including the components on a single client device 502, the graphic design system 500 can include one or more of the illustrated components on a plurality of devices.

In one or more embodiments, each of the components and subcomponents of the graphic design system 500 can be in communication with one another using any suitable communication technologies. It will be recognized that although the subcomponents of the graphic design system 500 are shown to be separate in FIG. 5, any of the subcomponents may be combined into fewer components, such as into a single component, or divided into more components as may serve a particular implementation. Furthermore, although the components of FIG. 5 are described in connection with the graphic design system 500, at least some of the components for performing operations in conjunction with the graphic design system 500 described herein may be implemented on other devices and/or with other systems.

The components of the graphic design system 500 can include software, hardware, or both. For example, the components of the graphic design system 500 (e.g., the user interface manager 504, the user input manager 506, the input stream analyzer 508, the animation generator 510, and the data storage manager 512) can include one or more instructions stored on a computer-readable storage medium and executable by processors of one or more computing devices such as the client device 502. When executed by the one or more processors, the computer-executable instructions of the graphic design system 500 can cause the computing device(s) to perform the depth correction processes described herein. Alternatively, the components of the graphic design system 500 can comprise hardware, such as a special purpose processing device to perform a certain function or group of functions. Additionally or alternatively, the components of the graphic design system 500 can comprise a combination of computer-executable instructions and hardware.

Furthermore, the components of the graphic design system 500 performing the functions described herein with respect to the graphic design system 500 may, for example, be implemented as part of a stand-alone application, as a module of an application, as part of a suite of applications, as a plug-in for applications including content creation applications, as a library function or functions that may be called by other applications, and/or as a cloud-computing model. Thus, the components of the graphic design system 500 may be implemented as part of a stand-alone application on a personal computing device or a mobile device. Alternatively or additionally, the components of the graphic design system 500 may be implemented in any application that allows delivery of content to users, including, but not limited to, applications in ADOBE CREATIVE CLOUD, ADOBE PHOTOSHOP, ADOBE ILLUSTRATOR, and ADOBE PRESENTER. "ADOBE", "CREATIVE CLOUD", "PHOTOSHOP" "ILLUSTRATOR", and "ADOBE PRESENTER" are registered trademarks of Adobe Systems Incorporated in the United States and/or other countries.

As previously described, the graphic design system 500 can include a user interface manager 504. In particular, the user interface manager 504 facilitates display of content on a display device of the client device 502. For example, the user interface manager 504 determines how and where content is displayed on the display device. To illustrate, the user interface manager 504 communicates with the display device to present content for one or more applications associated with the graphic design system 500.

The graphic design system 500 can also include a user input manager 506 to facilitate detecting and interpreting user input. Specifically, the user input manager 506 detects input from one or more input devices in communication with the client device 502. Additionally, the user input manager 506 interprets user input to determine how a user is interacting with content displayed on the display device. For example, the user input manager 506 communicates with the user interface manager 504 to provide user input information to the user interface manager 504. The user input manager 506 can also identify text input from a keyboard device or via a keyboard interface in connection with importing one or more animation character elements.

The graphic design system 500 further can include an input stream analyzer 508 to analyze an input stream from an input device. For example, the input stream analyzer 508 analyzes a digital drawing input stream to identify information associated with a digital drawing. As a user provides input to create a digital drawing, the input stream analyzer 508 receives data from the user input manager 506. The input stream analyzer 508 analyzes the received data from the user input manager 506 to identify input points and other data associated with the digital drawing to determine information for providing to the animation generator 510 to generate an animation element for the digital drawing.

Additionally, the graphic design system 500 can include an animation generator 510 to facilitate generating an animation element from a digital drawing that includes a plurality of strokes. Specifically, the animation generator 510 receives data from the input stream analyzer 508 for performing one or more operations associated with converting the input stream into an animation element. For example, the animation generator 510 generates stroke points for the animation element from input points in the input stream. Additionally, the animation generator 510 performs one or more operations for optimizing the plurality of strokes in the digital drawing to reduce the amount of information stored with the animation element.

Furthermore, the animation generator 510 generates drawing time information associated with the animation element. In particular, the animation generator 510 determines timestamps for a plurality of stroke points in each stroke of the animation element. For example, the animation generator 510 assigns timestamps to the stroke points based on distances between the stroke points. Thus, the animation generator 510 can provide stroke point information that results in uniform drawing times for the plurality of strokes in the animation element. The animation generator 510 can also store the drawing time information and stroke point information as metadata for the animation element.

The graphic design system 500 also includes a data storage manager 512 to manage data that the other components in the graphic design system 500 use and/or produce. Specifically, the data storage manager 512 can communicate with the other components in the graphic design system 500 (i.e., the user interface manager 504, the user input manager 506, the input stream analyzer 508, and the animation generator 510) to obtain data that the components have produced for storage and/or use by one or more of the components. To illustrate, the data storage manager 512 can store data that includes, but is not limited to, an animation database 514 that includes a plurality of previously generated animation elements. In one or more embodiments, the data storage manager 512 stores the animation database 514 on the client device 502 so that a user may import animation elements into an application from a storage device on the client device 502.

In one or more alternative embodiments, the data storage manager 512 stores the animation database 514 on a remote computing device (e.g., a server) that is accessible to the client device 502. Specifically, when a user accesses the animation database 514 from the client device 502, the client device 502 may store a plurality of pointers to animation elements within the animation database 514 in addition to preview information for the animation elements. When the user attempts to access a particular animation element from the animation database 514, the client device 502 may download the animation element using the corresponding pointer and store the animation element in an animation database 514 at the client device 502. The animation database 514 may include a plurality of animation elements from a plurality of different users on a plurality of different computing devices that have access to the remote computing device. If the user creates an animation element, the client device 502 can upload the animation element to the animation database 514 at the remote computing device.

FIGS. 1-5, the corresponding text, and the examples, provide a number of different systems and devices for generating animation elements from digital drawings. In addition to the foregoing, embodiments can be described in terms of flowcharts comprising acts and steps in a method for accomplishing a particular result. For example, FIGS. 6 and 7 illustrate flowcharts of exemplary methods in accordance with one or more embodiments.

Figure 6:
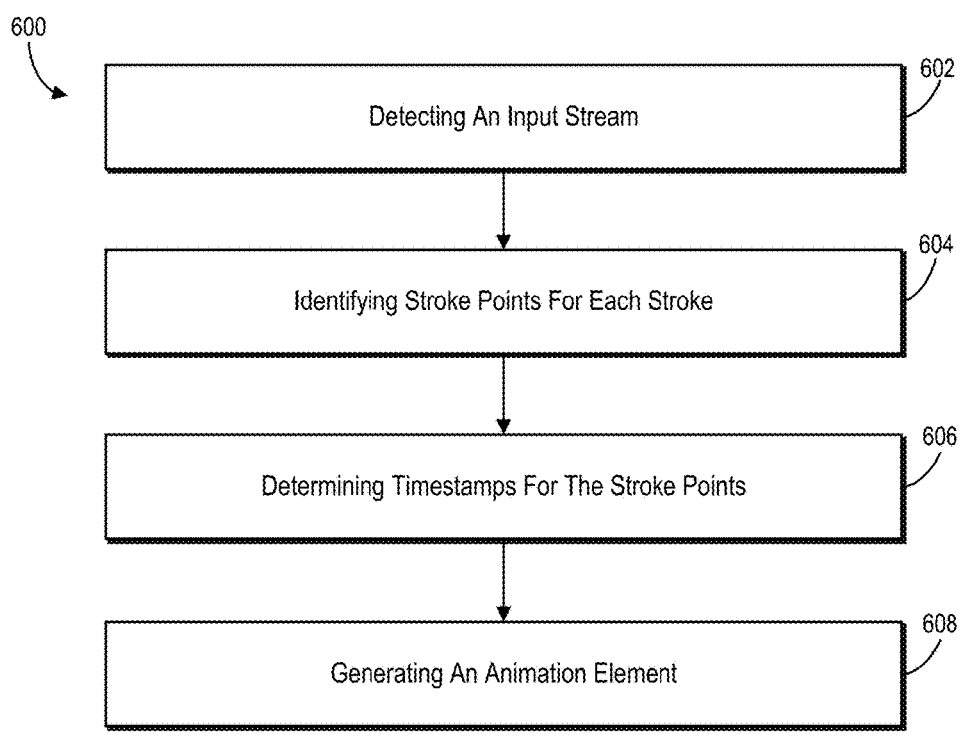
FIG. 6 illustrates a flowchart of a series of acts in a method of creating reusable drawing animations in accordance with one or more embodiments.
Figure 7:
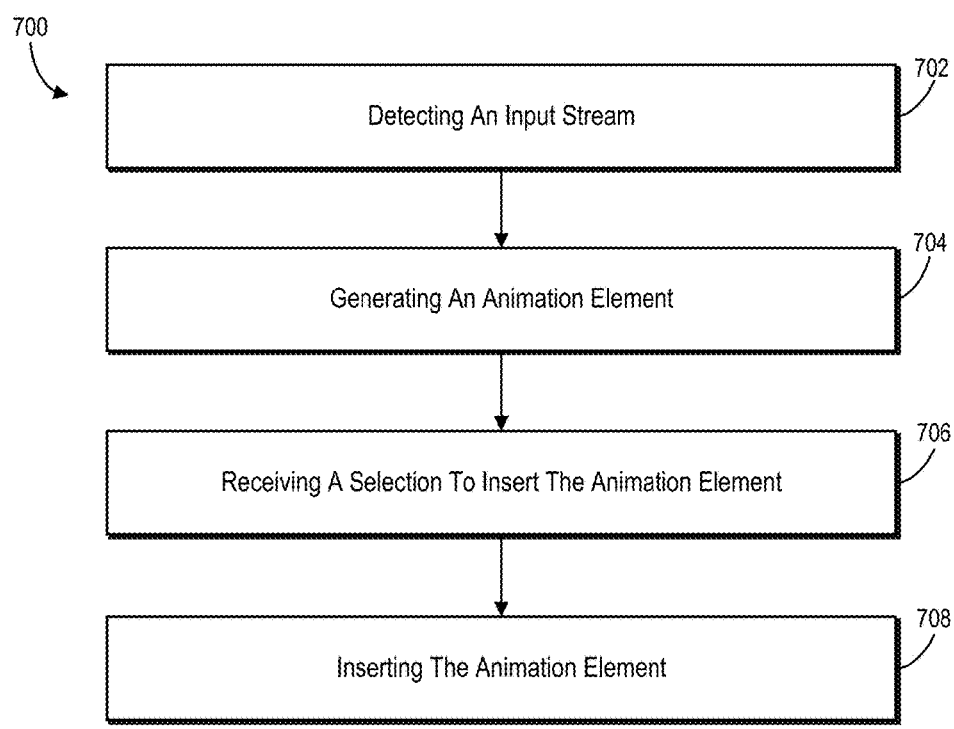
FIG. 7 illustrates a flowchart of a series of acts in a method of using a reusable drawing animations in accordance with one or more embodiments.

FIG. 6 illustrates a flowchart of a series of acts in a method 600 of creating reusable drawing animations. The method 600 includes an act 602 of detecting an input stream. For example, act 602 involves detecting a digital drawing input stream comprising a plurality of strokes. To illustrate, act 602 can involve detecting the digital drawing input stream from a touchscreen input. For instance, act 602 can involve detecting, via the touchscreen input, input associated with drawing one or more digital strokes within a user interface 102.

Additionally, act 602 can involve identifying the plurality of different strokes based on breaks in the digital drawing input stream. For example, act 602 can involve identifying continuous input from an input device in the digital drawing input stream as a single stroke in the plurality of different strokes.

The method 600 further includes an act 604 of identifying stroke points for each stroke. For example, act 604 involves identifying a plurality of stroke points for each stroke from the plurality of strokes. To illustrate, act 604 can involve identifying a plurality of input points from the digital drawing input stream, and processing the plurality of input points to determine the plurality of stroke points for each stroke.

As part of act 604, or as an additional act, the method 600 can include determining an initial plurality of stroke points in a first stroke from the plurality of strokes, and smoothening the first stroke by modifying a position of one or more stroke points from the initial plurality of stroke points by applying a moving average algorithm to the initial plurality of stroke points in the first stroke. Additionally, the method 600 can include reducing a stroke point density of the first stroke from the plurality of strokes by applying a stroke point reduction algorithm to the first stroke. For example, reducing the stroke point density of the first stroke can involve replacing the first stroke with a similar stroke having fewer stroke points.

Additionally, the method 600 involves an act 606 of determining timestamps for the stroke points. For example, act 606 involves determining, for each stroke from the plurality of strokes, a plurality of timestamps for the plurality of stroke points, each timestamp indicating a drawing time of a corresponding stroke point. To illustrate, act 606 can involve determining a plurality of timestamps for a plurality of stroke points of a first stroke to create a smooth drawing time associated with drawing the first stroke. For instance, act 606 can involve assigning a timestamp for a stroke point from the plurality of stroke points based on a distance between the stroke point and a chronologically previous stroke point.

Additionally, act 606 can involve identifying a first stroke point in a first stroke, identifying a second stroke point in the first stroke, the second stroke point chronologically after the first timestamp, and determining a distance between the first stroke point and the second stroke point. Act 606 can further involve generating a timestamp for the second stroke point based on the determined distance between the first stroke point and the second stroke point.

The method 600 also involves an act 608 of generating an animation element. For example, act 608 involves generating an animation element 218 based on the plurality of stroke points and the plurality of timestamps associated the plurality of stroke points. To illustrate, act 610 can involve storing the animation element 218 in a unique animation element file with stroke point information and drawing time information. Additionally, act 608 can involve storing, with the animation element 218, a width and a color for each stroke from the plurality of strokes based on the digital drawing input stream.

FIG. 7 illustrates a flowchart of a series of acts in another method 700 of using a reusable drawing animations. The method 700 involves an act 702 of detecting an input stream. For example, act 702 involves detecting a digital drawing input stream comprising a plurality of strokes. To illustrate, act 702 can involve detecting the digital drawing input stream from a touchscreen input. For instance, act 602 can involve detecting, via the touchscreen input, input associated with drawing one or more digital strokes within a user interface 102 of a first application.

The method 700 also includes an act 704 of generating an animation element. For example, act 704 involves generating a first animation element 218 comprising drawing time information and stroke point information for the plurality of strokes. To illustrate, act 704 can involve determining the stroke point information from a plurality of stroke points associated with the plurality of strokes. Additionally, act 704 can involve processing the plurality of stroke points to smoothen the plurality of strokes and reduce an amount of stroke point information stored with the first animation element 218.

The method 700 further includes an act 706 of receiving a selection to insert the animation element 218. For example, act 706 involves receiving a selection to insert the first animation element into a user interface 202. To illustrate, act 710 can involve displaying a plurality of animation elements from an animation database 514 in the user interface, and receiving the selection to insert the first animation element from the animation database 514.

Additionally, the method 700 includes an act 708 of inserting the animation element 218. For example, act 708 involves inserting the first animation element 218 with the drawing time information and stroke point information into the user interface 202 based on the received selection. To illustrate, act 708 can involve importing the first animation element 218 from an animation element file at an animation database 514, and inserting the first animation element 218 into the user interface 202. Act 708 can also involve inserting the first animation element 218 from the animation element file into a user interface 202 of a second application compatible with a file format associated with the animation element. Act 708 can involve accessing the animation database 514 from a remotely stored computing device, and importing the first animation element 218 from the remotely stored computing device.

As part of act 708, or as part of an additional act, the method 700 can include providing an option to play the first animation element 218 according to the drawing time information and the stroke point information of the first animation element 218. Additionally, the method 700 can include receiving a selection of the option to play the first animation element 218, and playing the first animation element 218 by redrawing the plurality of strokes based on the drawing time information and the stroke point information.

The method 700 can also include receiving a selection to insert a second animation element into the user interface 202 with the first animation element 218, and inserting the second animation element into the user interface based on the received selection. Additionally, the method 700 can include providing an option to play the second animation element according to drawing time information and stroke point information of the second animation element, receiving a selection of the option to play the second animation element, playing the second animation element by redrawing the plurality of strokes based on the drawing time information and the stroke point information for the second animation element. Additionally, the option to play the second animation element plays the second animation element independently of other animation elements in the user interface 202.

The method 700 can further include receiving a selection to modify a visual characteristic of the first animation element 218 within the user interface 202, and modifying the visual characteristic of the first animation element 218 within the user interface 202. For example, the method 700 can include modifying a playback speed factor associated with the first animation element 218. In another example, the method 700 can include modifying a position or timestamp of one or more stroke points from the plurality of stroke points in the first animation element 218. Additionally, the method 700 can include modifying a color or a width of one or more strokes from the plurality of strokes.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
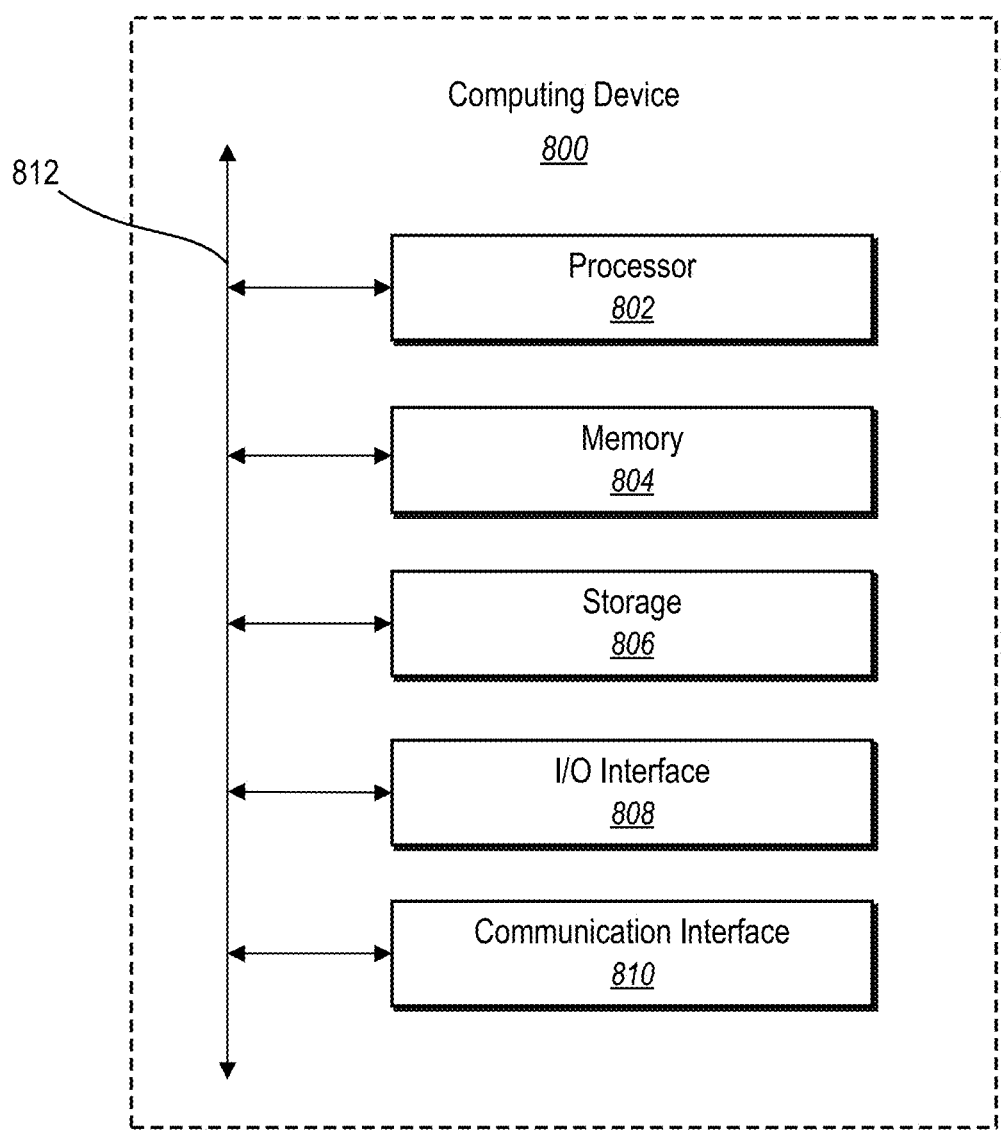
FIG. 8 illustrates a block diagram of an exemplary computing device in accordance with one or more embodiments.

FIG. 8 illustrates a block diagram of exemplary computing device 900 that may be configured to perform one or more of the processes described above. One will appreciate that one or more computing devices such as the computing device 800 may implement the graphic design system 500. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 900 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for creating reusable drawing animations, a method comprising:
    detecting, by at least one processor, a digital drawing input stream to create a digital drawing comprising a plurality of strokes;
    identifying, by the at least one processor, a plurality of stroke points for each stroke from the plurality of strokes;
    determining, by the at least one processor and for each stroke from the plurality of strokes, a plurality of timestamps for the plurality of stroke points, each timestamp indicating a drawing time of a corresponding stroke point;
    generating, by the at least one processor, an animation element comprising the plurality of stroke points and the plurality of timestamps for the plurality of stroke points as metadata, wherein executing the animation element produces an animation of a creation of the digital drawing according to the plurality of stroke points and the plurality of timestamps for the plurality of stroke points;
    detecting, by the at least one processor, insertion of a handwritten or typed text character into a user interface;
    determining, by the at least one processor, that the generated animation element comprises an animation of writing the text character; and
    converting, by the at least one processor, the handwritten or typed text character into the animation of writing the text character from the generated animation element within the user interface.

2. The method as recited in claim 1, further comprising identifying a stroke segment of a first stroke from the plurality of strokes by extracting a Bezier curve from a plurality of stroke points in the first stroke.

3. The method as recited in claim 1, further comprising:
    determining an initial plurality of stroke points in a first stroke from the plurality of strokes; and
    smoothening the first stroke by modifying a position of one or more stroke points from the initial plurality of stroke points by applying a moving average algorithm to the initial plurality of stroke points in the first stroke.

4. The method as recited in claim 3, further comprising reducing a stroke point density of the first stroke from the plurality of strokes by applying a stroke point reduction algorithm to the first stroke.

5. The method as recited in claim 1, wherein determining the plurality of timestamps for the plurality of stroke points comprises determining a plurality of timestamps for a plurality of stroke points of a first stroke to create a smooth drawing time associated with drawing the first stroke.

6. The method as recited in claim 5, wherein determining the plurality of timestamps for the plurality of stroke points of the first stroke comprises assigning a timestamp for a stroke point from the first stroke based on a distance between the stroke point and a chronologically previous stroke point.

7. The method as recited in claim 6, wherein assigning the timestamp for the stroke point from the first stroke comprises:
    identifying a first stroke point in the first stroke and a second stroke point in the first stroke, the second stroke point chronologically before the first stroke point;
    determining a drawing time for the first stroke according to a consistent drawing time corresponding to the animation element;
    identifying a timestamp of the second stroke point;
    determining a distance between the first stroke point and the second stroke point; and
    generating, in response to determining the distance between the first stroke point and the second stroke point, a timestamp for the first stroke point based on the determined distance between the first stroke point and the second stroke point and the drawing time for the first stroke.

8. The method as recited in claim 1, further comprising:
    detecting insertion of an object into the user interface;
    detecting, using image recognition, a shape of the object;
    determining that the detected shape of the object corresponds to a previously generated animation element comprising an animation of drawing the detected shape; and
    importing the previously generated animation element into the user interface in response to the detected shape.

9. In a digital medium environment for creating reusable drawing animations, a system comprising:

at least one processor;
a non-transitory computer readable storage medium comprising instructions that, when executed on the at least one processor, cause the system to:
detect a digital drawing input stream to create a digital drawing comprising a plurality of strokes;
determine stroke point information and timestamp information for the plurality of strokes;
generate an animation element comprising the stroke point information and the timestamp information as metadata, wherein executing the animation element produces an animation of a creation of the digital drawing according to the stroke point information and the timestamp information for the plurality of strokes;
detect insertion of handwritten or typed text character into a user interface;
determine that the generated animation element comprises an animation of writing the text character; and
convert the handwritten or typed text character into the animation of writing the text character from the generated animation element within the user interface, the generated animation element comprising the stroke point information and timestamp information from the metadata of the animation element.

10. The system as recited in claim 9, further comprising instructions that, when executed by the at least one processor, cause the system to determine the timestamp information for the plurality of strokes by:
identifying a first stroke point in the first stroke and a second stroke point in the first stroke, the second stroke point chronologically after the first stroke point;
determining a drawing time for the first stroke according to a consistent drawing time corresponding to the animation element;
identifying a timestamp of the first stroke point;
determining a distance between the first stroke point and the second stroke point; and
assigning, in response to determining the distance between the first stroke point and the second stroke point, a timestamp for the second stroke point based on the determined distance between the first stroke point and the second stroke point and the drawing time for the first stroke.

11. The system as recited in claim 9, further comprising instructions that, when executed by the at least one processor, cause the system to:
determine a width and a color for each stroke from the plurality of strokes based on the digital drawing input stream;
store the width and the color for each stroke from the plurality of strokes with the metadata of the animation element; and
draw the animation element in the user interface with the determined width and color for each stroke from the plurality of strokes from the metadata of the animation element.

12. The system as recited in claim 9, further comprising instructions that, when executed by the at least one processor, cause the system to:
detect the digital drawing input stream and generate the animation element within a user interface of a first application; and
insert the animation element into a user interface of a second application to reproduce the digital drawing within the user interface of the second application according to the stroke point information and the timestamp information from the metadata of the animation element.

13. The system as recited in claim 9, further comprising instructions that, when executed by the at least one processor, cause the system to:
detect insertion of an object into the user interface;
detect, using image recognition, a shape of the object;
determine that the detected shape of the object corresponds to a previously generated animation element comprising an animation of drawing the detected shape; and
import the previously generated animation element into the user interface in response to the detected shape.

14. A non-transitory computer readable storage medium comprising instructions that, when executed by at least one processor, causes a computer system to:
detect a digital drawing input stream to create a digital drawing comprising a plurality of strokes;
identify a plurality of stroke points for each stroke from the plurality of strokes;
determine, for each stroke from the plurality of strokes, a plurality of timestamps for the plurality of stroke points, each timestamp indicating a drawing time of a corresponding stroke point;
generate an animation element comprising the plurality of stroke points and the plurality of timestamps for the plurality of stroke points as metadata, wherein executing the animation element produces an animation of a creation of the digital drawing according to the plurality of stroke points and the plurality of timestamps for the plurality of stroke points;
detect insertion of a handwritten or typed text character into a user interface;
determine that the generated animation element comprises an animation of writing the text character; and
convert the handwritten or typed text character into the animation of writing the text character from the generated animation element within the user interface.

15. The non-transitory computer readable storage medium as recited in claim 14, further comprising instructions that, when executed by the at least one processor, cause the computer system to:
determine an initial plurality of stroke points in a first stroke from the plurality of strokes;
smoothen the first stroke by modifying a position of one or more stroke points from the initial plurality of stroke points by applying a moving average algorithm to the initial plurality of stroke points in real time from the digital drawing input stream; and
store, with the metadata of the animation element, a plurality of stroke points and a plurality of timestamps for the smoothened first stroke.

16. The non-transitory computer readable storage medium as recited in claim 14, further comprising instructions that, when executed by the at least one processor, cause the computer system to reduce a stroke point density of a first stroke from the plurality of strokes by applying a stroke point reduction algorithm to the first stroke.

17. The non-transitory computer readable storage medium as recited in claim 14, further comprising instructions that, when executed by the at least one processor, cause the computer system to determine the plurality of timestamps for the plurality of stroke points by:
determining a plurality of timestamps for a plurality of stroke points of a first stroke from the plurality of strokes to create a smooth drawing time associated with drawing the first stroke according to a consistent drawing time associated with the animation element; and assigning a timestamp for a stroke point from the first stroke in response to determining a distance between the stroke point and a chronologically previous stroke point and based on the smooth drawing time associated with drawing the first stroke.

18. The non-transitory computer readable storage medium as recited in claim 14, further comprising instructions that, when executed by the at least one processor, cause the computer system to:

reproduce, in the user interface, the digital drawing according to the plurality of stroke points and the plurality of timestamps for the plurality of stroke points using the metadata of the animation element;

receive a request to modify a speed factor associated with reproducing the digital drawing; and modifying, in response to the request to modify the speed factor, at least one timestamp of the plurality of timestamps for the plurality of stroke points.

19. The non-transitory computer readable storage medium as recited in claim 18, further comprising instructions that, when executed by the at least one processor, cause the computer system to:

receive a request to modify a size characteristic of the animation element; and modify, in response to the request to modify the size characteristic, a plurality of stroke points for the plurality of stroke points.

20. The non-transitory computer readable storage medium as recited in claim 14, further comprising instructions that, when executed by the at least one processor, cause the computer system to:

detect insertion of an object into the user interface;

detect, using image recognition, a shape of the object;

determine that the detected shape of the object corresponds to a previously generated animation element comprising an animation of drawing the detected shape; and import the previously generated animation element into the user interface in response to the detected shape.

* * * * *